US012062532B2

(12) United States Patent
Richardson et al.

(10) Patent No.: US 12,062,532 B2
(45) Date of Patent: Aug. 13, 2024

(54) TWO DIMENSIONAL MSMS

(71) Applicant: Micromass UK Limited, Wilmslow (GB)

(72) Inventors: Keith Richardson, High Peak (GB); Jason Lee Wildgoose, Stockport (GB)

(73) Assignee: Micromass UK Limited, Wilmslow (GB)

(*) Notice: Subject to any disclaimer, the term of this patent is extended or adjusted under 35 U.S.C. 154(b) by 0 days.

(21) Appl. No.: 18/450,232

(22) Filed: Aug. 15, 2023

(65) Prior Publication Data

US 2023/0395362 A1 Dec. 7, 2023

Related U.S. Application Data

(63) Continuation of application No. 17/356,793, filed on Jun. 24, 2021, now Pat. No. 11,769,654, which is a continuation of application No. 16/910,960, filed on Jun. 24, 2020, now Pat. No. 11,075,063, which is a continuation of application No. 16/093,443, filed as application No. PCT/GB2017/051052 on Apr. 13, 2017, now Pat. No. 10,727,036.

(60) Provisional application No. 62/322,404, filed on Apr. 14, 2016.

(51) Int. Cl.
*H01J 49/00* (2006.01)
*H01J 49/02* (2006.01)

(52) U.S. Cl.
CPC ...... *H01J 49/0031* (2013.01); *H01J 49/0009* (2013.01); *H01J 49/004* (2013.01); *H01J 49/005* (2013.01); *H01J 49/0072* (2013.01); *H01J 49/025* (2013.01)

(58) Field of Classification Search
CPC .. H01J 49/0031; H01J 49/0009; H01J 49/004; H01J 49/005; H01J 49/0072; H01J 49/025
See application file for complete search history.

(56) References Cited

U.S. PATENT DOCUMENTS

| | | | | |
|---|---|---|---|---|
| 6,872,939 B2 * | 3/2005 | Bateman | H01J 49/0081 250/288 |
| 7,034,292 B1 * | 4/2006 | Whitehouse | H01J 49/004 250/281 |
| 7,297,939 B2 * | 11/2007 | Bateman | H01J 49/421 250/281 |
| 10,446,385 B2 * | 10/2019 | Green | G01N 27/622 |
| 10,727,036 B2 * | 7/2020 | Richardson | H01J 49/005 |
| 11,075,063 B2 * | 7/2021 | Richardson | H01J 49/025 |
| 11,769,654 B2 * | 9/2023 | Richardson | H01J 49/005 250/282 |
| 2003/0213900 A1 * | 11/2003 | Hoyes | H01J 49/42 250/282 |
| 2004/0021070 A1 * | 2/2004 | Bateman | H01J 49/0081 250/288 |

(Continued)

Primary Examiner — David A Vanore
(74) Attorney, Agent, or Firm — Goodwin Procter LLP

(57) ABSTRACT

A method of mass spectrometry is disclosed comprising: performing a plurality of cycles of operation during a single experimental run, wherein each cycle comprises: mass selectively transmitting precursor ions of a single mass, or range of masses, through or out of a mass separator or mass filter at any given time, wherein the mass separator or mass filter is operated such that the single mass or range of masses transmitted therefrom is varied with time; and mass analysing ions.

15 Claims, 8 Drawing Sheets

(56) References Cited

U.S. PATENT DOCUMENTS

| | | | | |
|---|---|---|---|---|
| 2004/0094709 | A1* | 5/2004 | Bateman | H01J 49/004 250/287 |
| 2005/0277789 | A1* | 12/2005 | Bloomfield | H01J 49/063 564/4 |
| 2014/0224975 | A1* | 8/2014 | Kuehn | H01J 49/4215 250/288 |

* cited by examiner

TWO DIMENSIONAL MSMS

CROSS-REFERENCE TO RELATED APPLICATION

This application is a continuation of U.S. patent application Ser. No. 17/356,793, filed Jun. 24, 2021, which is a continuation of U.S. patent application Ser. No. 16/910,960, filed Jun. 24, 2020, now U.S. Pat. No. 11,075,063, which is a continuation of U.S. patent application Ser. No. 16/093,443, filed Oct. 12, 2018, now U.S. Pat. No. 10,727,036, which is a national phase filing claiming the benefit of and priority to International Patent Application No. PCT/GB2017/051052, filed on Apr. 13, 2017, which claims priority from and the benefit of U.S. Patent Application No. 62/322,404 filed on Apr. 14, 2016. The entire contents of these applications are incorporated herein by reference.

FIELD OF THE INVENTION

The present invention relates generally to mass spectrometers and in particular to mass spectrometers for obtaining two dimensional data sets.

BACKGROUND

In some existing data independent acquisition (DIA) modes of operation of mass spectrometers, the targeted ion population is substantially unfiltered, although some components may be "profiled" if they cannot transmit the entire population while operating in a single state. One or more fragmentation devices may be operated in more than one state in order to produce "low energy" data in which the ion population is substantially un-fragmented, and "high energy data" which predominantly consists of fragments of the original ion population. Through careful processing of the data produced it is possible to assign many of the fragment ions in the high energy population to "parent" or "precursor" ions in the low energy population. For generality, these acquisition modes will be referred to herein as multi-MS modes. While powerful, the qualitative and quantitative performance of multi-MS modes may be limited by the complexity of the samples involved and/or involve extra separation methods, such as ion mobility separation, which introduces extra cost and instrument complexity.

In some other DIA modes of operation, the ion population is filtered or pre-separated by mass to charge (m/z), usually with the aim of reducing the complexity of the products of fragmentation experiments performed after the filter, thereby improving the confidence of assignment of fragment ions to precursor ions and reducing interferences. The filter may be operated in a static configuration in which a single m/z range is selected for fragmentation (MSMS), or stepped through a predetermined series of static configurations. This latter category of DIA acquisition modes will be referred to herein as multi-MSMS for generality. The time-scale on which this stepping occurs is typically a minimum of around 1/20 second owing to limitations in instrument control and acquisition systems. When this stepping mode is required to profile a wide mass range with a narrow filter, the process becomes time consuming. Consider for example stepping through a mass range of 400 m/z units with a filter ion transmission window having a width of 5 m/z units. Even when the window is stepped such that the mass to charge ratios transmitted by the filter in each step do not overlap, 80 steps are still required to transmit the mass range of 400 m/z units, taking a minimum of 4 seconds. This time is longer than the time over which a peak elutes in some high performance chromatography experiments, and the goal of unbiased and quantitative profiling of chromatographic peaks cannot be fulfilled. Additionally, in multi-MSMS modes of acquisition, the mass to charge ratio of the precursor ion that corresponds to a particular fragment is known only to an accuracy of the width of the transmission window of the filter or mass separator.

SUMMARY

The present invention provides a method of mass spectrometry comprising:

performing a plurality of cycles of operation during a single experimental run, wherein each cycle comprises: mass selectively transmitting precursor ions of a single mass, or range of masses, through or out of a mass separator or mass filter at any given time, wherein the mass separator or mass filter is operated such that the single mass or range of masses capable of being transmitted therefrom is varied with time;

operating the mass separator or filter in a wideband mode between at least some of said plurality of cycles, wherein in each wideband mode the mass separator or filter transmits ions in a non-mass resolving manner; and mass analysing ions.

The ions transmitted by the mass separator or filter in each wideband mode may not be fragmented prior to mass analysis.

The method may comprise fragmenting or reacting ions transmitted by the mass separator or mass filter during at least one, or at least some, of said cycles; and mass analysing the resulting fragment or product ions.

The method may comprise varying the fragmentation energy or rate, or reaction energy or rate, during one or more of said cycles.

The fragmentation energy or rate, or reaction energy or rate, may vary in synchronism with the mass values transmitted by the mass separator or filter during a, or each, cycle.

As described above, the ions may not be fragmented in the wideband mode so that precursor ions are mass analysed, whereas the ions transmitted by the mass separator or mass filter in said cycles may be fragmented or reacted. In order to associate the precursor ions with their respective fragment or product ions, the method may further comprise a calibration procedure.

The calibration procedure may comprise: performing said plurality of cycles of operation on a mixture including a plurality of standards to obtain mass spectral data;

processing the data using a peak detection algorithm; matching detected mass peaks to theoretically expected mass peaks for the standards; and constructing a mapping or calibration relationship between the mass to charge ratio values for the standards and the time of transmission of the standards by the mass separator or mass filter.

This method correlates the mass to charge ratio transmitted by the mass separator or filter with the time of its transmission. Standards may be used which do not fragment during the experiment. Alternatively, standards may be used that fragment prior to detection, as the peaks for the fragments of the standards will occur at the same time and have the same profile as the peaks of the precursor ions of the standards would have had, had they not been fragmented. As such, the fragment peaks of the standards may be used in the step of matching detected mass peaks to theoretically expected mass peaks for the standards.

The method may comprise using the time of detection of a fragment or product ion and said mapping or calibration relationship to determine the mass to charge ratio of the precursor ion of said fragment of product ion.

As the time of detection of any given fragment or product ion by the mass analyser is related to the time of transmission of its respective precursor ion by the mass separator or mass filter, the time of detection of the fragment or product ion can be used to determine when its precursor ion was transmitted. As the function of how the masses capable of being transmitted by the mass separator or filter varies with time is known (from the mapping or calibration relationship), the time determined for when the precursor ion was transmitted can be used to determine the mass to charge ratio of the precursor ion. The detected fragment or product ion can therefore be associated with its precursor ion. Optionally, the precursor mass to charge ratio determined may be matched to a precursor ion mass analysed in the wideband mode.

In at least one or at least some of the cycles, the period of time during which ions are capable of being mass selectively transmitted by the mass separator or filter may be longer than the period of time that one of the wideband modes is operated in.

The present invention also provides a method of mass spectrometry comprising:

performing a plurality of cycles of operation during a single experimental run, wherein each cycle comprises: mass selectively transmitting precursor ions of a single mass, or range of masses, through or out of a mass separator or mass filter at any given time, wherein the mass separator or mass filter is operated such that the single mass or range of masses capable of being transmitted therefrom is varied with time; and mass analysing ions.

In any given cycle the mass, or range of masses, transmitted by the mass separator or mass filter may progressively increase (or decrease) from the start to the end of the cycle.

In the methods described herein, the ions transmitted by the mass separator or filter in at least some of said cycles may be fragmented with a substantially constant collision energy or fragmentation rate to produce fragment ions. The collision energy or fragmentation rate may be maintained constant for substantially the whole of one or more of said cycles.

Ions transmitted by the mass separator or filter in at least some of said cycles may be reacted at a substantially constant reaction rate to produce product ions. The reaction rate may be maintained constant for substantially the whole of one or more of said cycles.

The methods may comprise: operating a first mode in which ions transmitted by the mass separator or mass filter are fragmented or reacted, and mass analysing the resulting fragment or product ions; operating a second mode in which the precursor ions transmitted by the mass separator or filter are substantially not fragmented or reacted, and mass analysing these ions; switching to, or alternating between, the first and second modes in a single experimental run, wherein the switching or alternating between the first and second modes is synchronised with switching to new cycles of the plurality of cycles.

Ions transmitted in a first one or a first set of said cycles are subjected to said first mode and ions transmitted in a second different one or set of said cycles are subjected to said second mode.

The ions transmitted by the mass separator or filter in the first mode may be fragmented with a substantially constant collision energy or fragmentation rate to produce fragment ions, or may be reacted at a substantially constant reaction rate to produce product ions.

In the first mode, the ions transmitted by the mass separator or filter may be fragmented with a collision energy or fragmentation rate, or are reacted at a reaction rate, that increases or decreases over each cycle.

The mass separator or mass filter may mass selectively transmit precursor ions as a function of time in the same manner during both the first and second modes.

The methods may comprise associating fragment or product ions detected in the first mode with their respective precursor ions detected in the second mode based on their times of detection and/or signal intensity profiles detected by the mass analyser.

The methods may comprise performing a plurality of said cycles whilst varying the collision energy or fragmentation rate, or reaction rate, such that the energy or rate is different for different cycles.

The energy or rate may increase progressively, increase in a continuous manner, or increase in a stepped manner, throughout each cycle such that the energy or rate is different for the different cycles; or the energy or rate may decrease progressively, decrease in a continuous manner, or decrease in a stepped manner, throughout each cycle such that the energy or rate is different for different cycles.

The mass separator or filter may be an ion trap that mass selectively scans ions out of the trap in each of the cycles.

The width of the range of masses that is capable of being transmitted by the mass separator or filter at any given time may be varied during one or more of the cycles and/or between different ones of said cycles.

The mass range that is scanned or stepped through by the mass separator or filter may be different for different cycles.

The methods may comprise operating the method in a mode which performs a plurality of successive ones of said cycles whilst maintaining the collision energy or fragmentation rate, or reaction rate, constant and so as to cause fragmentation or reaction of the ions.

The methods may comprise operating the method in a mode which performs a plurality of successive ones of said cycles whilst maintaining the collision energy or fragmentation rate, or reaction rate, constant and so as to substantially not cause fragmentation or reaction of the ions.

The methods may comprise performing $\geq z$ cycles in the single experimental run, wherein z is selected from the group consisting of: 3, 4, 5, 6, 7, 8, 9, 10, 15, 20, 25, 30, 35, 40, 45, and 50.

The mass separator or filter may be operated such that in each cycle the mass, or mass range, capable of being transmitted therefrom is either continuously scanned or stepped in mass to charge ratio as a function of time.

Where the mass (or mass range) capable of being transmitted is stepped as a function of time, the mass (or mass range) may be stepped so as to bypass a mass range that is not of interest.

The total mass range that is scanned or stepped through by the mass separator or filter in a cycle may be the same for a plurality of the cycles or all of the cycles.

The mass filter may be a quadrupole mass filter or other multipole mass filter; or the mass separator or mass filter may be an ion trap that, optionally, mass selectively transmits ions of different masses downstream at different times during each cycle.

Ions transmitted by the mass separator or filter in at least some of said cycles may be fragmented or reacted to produce fragment or product ions, optionally with a constant or variable collision energy.

Where the collision energy is varied with time, the collision energy may be scanned in a continuous manner, or varied in a stepped or discontinuous manner.

The methods may comprise: operating one mode in which ions transmitted by the mass separator or mass filter are fragmented or reacted, and mass analysing the resulting fragment or product ions; and/or operating another mode in which the precursor ions transmitted by the mass separator or filter are substantially not fragmented or reacted, and mass analysing these ions.

The methods may comprise switching to, or repeatedly alternating between, said one mode and said another mode in a single experimental run.

The methods may comprise associating fragment of product ions detected in said one mode with their respective precursor ions detected in said another mode, optionally, based on their times of detection and/or signal intensity profiles detected by the mass analyser.

The switching or alternating between the first and second modes may be synchronised with switching to new cycles of the plurality of cycles; optionally wherein ions transmitted in a first one or a first set of said cycles are subjected to said first mode and ions transmitted in a second different one or set of said cycles are subjected to said second mode.

The methods may comprise varying the fragmentation energy or rate, or reaction energy or rate, during one or more of said cycles, or during said experimental run; optionally wherein the fragmentation energy or rate, or reaction energy or rate, varies with or in synchronism with the mass values transmitted by the mass separator or filter during a, or each, cycle.

The fragmentation energy or rate (or reaction energy or rate) may be varied during each of said one or more of said cycles, or during said experimental run, in a continuous scanned manner, or may be varied in a stepped or discontinuous manner.

The mass analyser may mass analyse precursor ions transmitted by the mass separator or filter and/or mass analyses fragment or product ions derived from the precursor ions.

The methods may comprise separating the precursor ions transmitted by the mass separator or filter according to ion mobility.

The methods may comprise using the ion mobility separation to associate ion mobilities with the ions or mass spectra detected by the mass analyser.

In one mode the precursor ions may be pulsed into an ion mobility separator such that different precursor ions elute from the ion mobility separator at different times, wherein the mass analyser acquires a plurality of mass spectra as the different precursor ions elute, and wherein each mass spectrum is recorded together with an ion mobility associated with ions giving rise to that mass spectrum; and/or in another mode the precursor ions may be pulsed into an ion mobility separator such that different precursor ions elute from the ion mobility separator at different times, wherein the ions are then fragmented or reacted to produce fragment or product ions that remain separated according to the ion mobility of their precursor ions, wherein the mass analyser acquires a plurality of mass spectra for the fragment or product ions, and wherein each mass spectrum is recorded together with an ion mobility associated with a precursor ion of the fragment or product ions giving rise to that mass spectrum.

The methods may comprise separating components of an analyte sample in a sample separation device, such as a liquid chromatography device, ionising the sample eluting from the sample separation device and supplying the resulting ions to the mass separator or filter.

The methods may comprise using the sample separation to associate elution times from the sample separation device with the ions or mass spectra detected by the mass analyser; optionally wherein the mass analyser acquires a plurality of mass spectra as the sample elutes from the sample separation device, and wherein each mass spectrum is recorded together with an associated elution time from the sample separation device.

The mass analyser may acquire a plurality of mass spectra for the precursor ions, and/or fragment or product ions derived therefrom, that are transmitted in each cycle of the mass separator or filter.

The mass analyser may acquire ≥x mass spectra during each of the cycles, wherein x is selected from the group consisting of: 5, 10, 20, 30, 40, 50, 60, 70, 80, 90, 100, 150, 200, 250, 300, 35, 400, 450, 500, 600, 700, 800, 900 and 1000; and/or the mass analyser may acquire mass spectra at a rate of ≥y scans per second during each cycle, wherein y is selected from the group consisting of: 5, 10, 20, 30, 40, 50, 60, 70, 80, 90, 100, 150, 200, 250, 300, 35, 400, 450, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, 3000, 4000, and 5000.

The duration of each cycle may be selected from the group consisting of: ≥0.01 s; ≥0.02 s; ≥0.03 s; ≥0.04 s; ≥0.05 s; ≥0.06 s; ≥0.07 s; ≥0.08 s; ≥0.09 s; ≥0.1 s; ≥0.15 s; ≥0.2 s; ≥0.25 s; ≥0.3 s; ≥0.35 s; ≥0.4 s; ≥0.45 s; ≥0.5 s; ≥0.55 s; ≥0.6 s; ≥0.65 s; ≥0.7 s; ≥0.75 s; ≥s; ≥0.85 s; ≥0.9 s; ≥1 s; ≥1.1 s; ≥1.2 s; ≥1.3 s; ≥1.4 s; ≥1.5 s; ≥1.6 s; ≥1.7 s; ≥1.8 s; ≥1.9 s; ≥2 s; ≥2.5 s; and ≥3 s; and/or the duration of each cycle may be selected from the group consisting of: ≤0.02 s; ≤0.03 s; ≤0.04 s; ≤0.05 s; ≤0.06 s; ≤0.07 s; ≤0.08 s; ≤0.09 s; ≤0.1 s; ≤0.15 s; ≤0.2 s; ≤0.25 s; ≤0.3 s; ≤0.35 s; ≤0.4 s; ≤0.45 s; ≤0.5 s; ≤0.55 s; ≤0.6 s; ≤0.65 s; ≤0.7 s; ≤0.75 s; ≤0.80 s; ≤0.85 s; ≤0.9 s; ≤1 s; ≤1.1 s; ≤1.2 s; ≤1.3 s; ≤1.4 s; ≤1.5 s; ≤1.6 s; ≤1.7 s; ≤1.8 s; ≤1.9 s; ≤2 s; ≤2.5 s; ≤3 s; ≤3.5 s; ≤4 s; ≤4.5 s; and ≤5 s.

The mass analyser may be a time of flight mass analyser, such as an orthogonal time of flight mass analyser.

The mass separator or filter may be operated in a wideband mode between at least some of said plurality of cycles, wherein in each wideband mode the mass separator or filter transmits ions in a non-mass resolving manner.

The ions transmitted by the mass separator or filter in each wideband mode may not be fragmented prior to mass analysis.

In at least one or at least some of the cycles, the period of time during which ions are mass selectively transmitted by the mass separator or filter may be longer than the period of time that one of the wideband modes is operated in.

The mass range that is scanned or stepped through by the mass separator or filter may be different for different cycles.

The width of the range of masses that is transmitted by the mass separator or filter at any given time may be varied during one or more of the cycles and/or between different ones of said cycles.

The duration over which ions are mass selectively transmitted by the mass separator or filter time may be varied during one or more of the cycles and/or between different ones of said cycles.

Different ones of said cycles may at least partially overlap each other in time.

The step of mass analysing described herein may comprise obtaining mass spectral data repeatedly over each of said cycles and recording the data. The rate at which mass spectra are obtained is fast enough to profile sample eluting from the mass separator or mass filter in each cycle.

The methods may comprise performing a calibration procedure that comprises: performing said plurality of cycles of operation on a mixture including a plurality of standards to obtain mass spectral data; processing the data using a peak detection algorithm; matching detected mass peaks to theoretically expected mass peaks for the standards; and constructing a mapping or calibration relationship between the mass to charge ratio values for the standards and the time of transmission of the standards by the mass separator or mass filter.

This method correlates the mass to charge ratio transmitted by the mass separator or filter with the time of its transmission. Standards may be used which do not fragment during the experiment. Alternatively, standards may be used that fragment prior to detection, as the peaks for the fragments of the standards will occur at the same time and have the same profile as the peaks of the precursor ions of the standards would have had, had they not been fragmented. As such, the fragment peaks of the standards may be used in the step of matching detected mass peaks to theoretically expected mass peaks for the standards.

The methods may comprise using the time of detection of a fragment or product ion and said mapping or calibration relationship to determine the mass to charge ratio of the precursor ion of said fragment or product ion.

As the time of detection of any given fragment or product ion by the mass analyser is related to the time of transmission of its respective precursor ion by the mass separator or mass filter, the time of detection of the fragment or product ion can be used to determine when its precursor ion was transmitted. As the function of how the masses capable of being transmitted by the mass separator or filter varies with time is known (from the mapping or calibration relationship), the time determined for when the precursor ion was transmitted can be used to determine the mass to charge ratio of the precursor ion. The detected fragment or product ion can therefore be associated with its precursor ion.

The methods may comprise assigning said fragment or product ion to said precursor ion.

The methods may comprise selecting one or more mass to charge ratios of interest, using said mapping or calibration relationship to determine the time of transmission of those one or more mass to charge ratios of interest, and extracting or isolating mass spectral data obtained for the time of transmission of said one or more mass to charge ratios of interest.

The present invention also provides a mass spectrometer comprising:

- a mass separator or mass filter;
- a mass analyser; and
- a controller arranged and adapted to control the spectrometer to perform a plurality of cycles of operation during a single experimental run, wherein each cycle comprises:
- mass selectively transmitting precursor ions of a single mass, or range of masses, through or out of the mass separator or mass filter at any given time, wherein the mass separator or mass filter is operated such that the single mass or range of masses capable of being transmitted therefrom is varied with time; and
- mass analysing ions in the mass analyser.

The mass spectrometer may be arranged and configured (e.g. set up to) perform any of the methods described herein.

The present invention also provides a method of mass spectrometry comprising: performing a plurality of cycles of operation during a single experimental run, wherein each cycle comprises: mass selectively transmitting precursor ions of a single mass, or range of masses, through or out of a mass separator or mass filter at any given time, wherein the mass separator or mass filter is operated such that the single mass or range of masses transmitted therefrom is varied with time; and mass analysing ions.

The plurality of cycles of operation may be performed in a single experimental run; optionally wherein the method comprises performing ≥z cycles in the single experimental run, wherein z is selected from the group consisting of: 2, 3, 4, 5, 6, 7, 8, 9, 10, 15, 20, 25, 30, 35, 40, and 50.

The mass separator or filter may be operated such that in each cycle the mass, or mass range, transmitted therefrom is either continuously scanned or stepped in mass to charge ratio as a function of time.

The total mass range that is scanned or stepped through by the mass separator or filter in a cycle may be the same for a plurality of the cycles or all of the cycles.

The mass filter may be a quadrupole mass filter or other multipole mass filter; or the mass separator or mass filter may be an ion trap that, optionally, mass selectively transmits ions of different masses downstream at different times during each cycle.

Ions transmitted by the mass separator or filter in at least some of said cycles may be fragmented or reacted to produce fragment or product ions, optionally with a constant or variable collision energy.

The method may comprise operating a first mode in which ions transmitted by the mass separator or mass filter are fragmented or reacted, and mass analysing the resulting fragment or product ions; and/or operating a second mode in which the precursor ions transmitted by the mass separator or filter are substantially not fragmented or reacted, and mass analysing these ions.

The method may comprise switching to, or alternating between, the first and second modes in a single experimental run.

The method may comprise associating fragment of product ions detected in the first mode with their respective precursor ions detected in the second mode, optionally, based on their times of detection and/or signal intensity profiles detected by the mass analyser.

The switching or alternating between the first and second modes may be synchronised with switching to new cycles of the plurality of cycles; optionally wherein ions transmitted in a first one or a first set of said cycles are subjected to said first mode and ions transmitted in a second different one or set of said cycles are subjected to said second mode.

The method may comprise varying the fragmentation energy or rate, or reaction energy or rate, during one or more of said cycles, or during said experimental run; optionally wherein the fragmentation energy or rate, or reaction energy or rate, varies with or in synchronism with the mass values transmitted by the mass separator or filter during a, or each, cycle.

The mass analyser may mass analyse precursor ions transmitted by the mass separator or filter and/or mass analyses fragment or product ions derived from the precursor ions.

The method may comprise separating the precursor ions transmitted by the mass separator or filter according to ion mobility upstream and/or downstream of a, or the, fragmentation or reaction device; and/or separating fragment or product ions transmitted by a, or the, fragmentation or reaction device according to ion mobility; and optionally, using the ion mobility separation to associate ion mobilities with the ions or mass spectra detected by the mass analyser.

The mass analyser may acquire a plurality of mass spectra for the precursor ions, and/or fragment or product ions derived therefrom, that are transmitted in each cycle of the mass separator or filter.

The mass analyser may acquire ≥x mass spectra during each of the cycles, wherein x is selected from the group consisting of: 5, 10, 20, 30, 40, 50, 60, 70, 80, 90, 100, 150, 200, 250, 300, 35, 400, 450, 500, 600, 700, 800, 900 and 1000.

The mass analyser may acquire mass spectra at a rate of ≥y scans per second during each cycle, wherein y is selected from the group consisting of: 5, 10, 20, 30, 40, 50, 60, 70, 80, 90, 100, 150, 200, 250, 300, 35, 400, 450, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, 3000, 4000, and 5000.

The duration of each cycle may be selected from the group consisting of: ≥0.01 s; ≥0.02 s; ≥0.03 s; ≥0.04 s; ≥0.05 s; ≥0.06 s; ≥0.07 s; ≥0.08 s; ≥0.09 s; ≥0.1 s; ≥0.15 s; ≥0.2 s; ≥s; ≥0.3 s; ≥0.35 s; ≥0.4 s; ≥0.45 s; ≥0.5 s; ≥0.55 s; ≥0.6 s; ≥0.65 s; ≥0.7 s; ≥0.75 s; ≥s; ≥0.85 s; ≥0.9 s; ≥1 s; ≥1.1 s; ≥1.2 s; ≥1.3 s; ≥1.4 s; ≥1.5 s; ≥1.6 s; ≥1.7 s; ≥1.8 s; ≥1.9 s; ≥2 s; ≥2.5 s; and ≥3 s.

The duration of each cycle may be selected from the group consisting of: ≤0.02 s; ≤0.03 s; ≤0.04 s; ≤0.05 s; ≤0.06 s; ≤0.07 s; ≤0.08 s; ≤0.09 s; ≤0.1 s; ≤0.15 s; ≤0.2 s; ≤0.25 s; ≤s; ≤0.35 s; ≤0.4 s; ≤0.45 s; ≤0.5 s; ≤0.55 s; ≤0.6 s; ≤0.65 s; ≤0.7 s; ≤0.75 s; ≤0.80 s; ≤s; ≤0.9 s; ≤1 s; ≤1.1 s; ≤1.2 s; ≤1.3 s; ≤1.4 s; ≤1.5 s; ≤1.6 s; ≤1.7 s; ≤1.8 s; ≤1.9 s; ≤2 s; ≤2.5 s; ≤3 s; ≤3.5 s; ≤4 s; ≤4.5 s; and ≤5 s.

The mass analyser may be a time of flight mass analyser such as an orthogonal time of flight mass analyser.

The method may comprise separating components of an analyte sample in sample separation device, ionising the sample eluting from the sample separation device and supplying the resulting ions to the mass separator or filter.

The mass separator or filter may be operated in a wideband mode between at least some of said plurality of cycles, wherein in each wideband mode the mass separator or filter transmits ions in a non-mass resolving manner.

The ions transmitted by the mass separator or filter in each wideband mode may not be fragmented prior to mass analysis.

In at least one or at least some of the cycles, the period of time during which ions are mass selectively transmitted by the mass separator or filter may be longer than the period of time that one of the wideband modes is operated in.

The mass range that is scanned or stepped through by the mass separator or filter may be different for different cycles.

The width of the range of masses that is transmitted by the mass separator or filter at any given time may be varied during one or more of the cycles and/or between different ones of said cycles.

The duration over which ions are mass selectively transmitted by the mass separator or filter time may be varied during one or more of the cycles and/or between different ones of said cycles.

Different ones of said cycles may at least partially overlap each other in time.

The invention also provides a mass spectrometer comprising: a mass separator or mass filter; a mass analyser; and a controller arranged and adapted to control the spectrometer to perform a plurality of cycles of operation during a single experimental run, wherein each cycle comprises: mass selectively transmitting precursor ions of a single mass, or range of masses, through or out of the mass separator or mass filter at any given time, wherein the mass separator or mass filter is operated such that the single mass or range of masses transmitted therefrom is varied with time; and mass analysing ions in the mass analyser.

The spectrometers described herein may comprise an ion source selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) an Impactor ion source; (xxii) a Direct Analysis in Real Time ("DART") ion source; (xxiii) a Laserspray Ionisation ("LSI") ion source; (xxiv) a Sonicspray Ionisation ("SSI") ion source; (xxv) a Matrix Assisted Inlet Ionisation ("MATT") ion source; (xxvi) a Solvent Assisted Inlet Ionisation ("SAII") ion source; (xxvii) a Desorption Electrospray Ionisation ("DER") ion source; (xxviii) a Laser Ablation Electrospray Ionisation ("LAESI") ion source; and (xxix) a Surface Assisted Laser Desorption Ionisation ("SALDI") ion source.

The spectrometer may comprise one or more continuous or pulsed ion sources.

The spectrometer may comprise one or more ion guides.

The spectrometer may comprise one or more ion mobility separation devices and/or one or more Field Asymmetric Ion Mobility Spectrometer devices.

The spectrometer may comprise one or more ion traps or one or more ion trapping regions.

The spectrometer may comprise one or more collision, fragmentation or reaction cells selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device.

The spectrometer may comprise a mass analyser selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic mass analyser arranged to generate an electrostatic field having a quadro-logarithmic potential distribution; (x) a Fourier Transform electrostatic mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser.

The spectrometer may comprise one or more energy analysers or electrostatic energy analysers.

The spectrometer may comprise one or more ion detectors.

The spectrometer may comprise one or more mass filters selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and (viii) a Wien filter.

The spectrometer may comprise a device or ion gate for pulsing ions; and/or a device for converting a substantially continuous ion beam into a pulsed ion beam.

The spectrometer may comprise a C-trap and a mass analyser comprising an outer barrel-like electrode and a coaxial inner spindle-like electrode that form an electrostatic field with a quadro-logarithmic potential distribution, wherein in a first mode of operation ions are transmitted to the C-trap and are then injected into the mass analyser and wherein in a second mode of operation ions are transmitted to the C-trap and then to a collision cell or Electron Transfer Dissociation device wherein at least some ions are fragmented into fragment ions, and wherein the fragment ions are then transmitted to the C-trap before being injected into the mass analyser.

The spectrometer may comprise a stacked ring ion guide comprising a plurality of electrodes each having an aperture through which ions are transmitted in use and wherein the spacing of the electrodes increases along the length of the ion path, and wherein the apertures in the electrodes in an upstream section of the ion guide have a first diameter and wherein the apertures in the electrodes in a downstream section of the ion guide have a second diameter which is smaller than the first diameter, and wherein opposite phases of an AC or RF voltage are applied, in use, to successive electrodes.

The spectrometer may comprise a device arranged and adapted to supply an AC or RF voltage to the electrodes. The AC or RF voltage optionally has an amplitude selected from the group consisting of: (i) about <50 V peak to peak; (ii) about 50-100 V peak to peak; (iii) about 100-150 V peak to peak; (iv) about 150-200 V peak to peak; (v) about 200-250 V peak to peak; (vi) about 250-300 V peak to peak; (vii) about 300-350 V peak to peak; (viii) about 350-400 V peak to peak; (ix) about 400-450 V peak to peak; (x) about 450-500 V peak to peak; and (xi)>about 500 V peak to peak.

The AC or RF voltage may have a frequency selected from the group consisting of: (i)<about 100 kHz; (ii) about 100-200 kHz; (iii) about 200-300 kHz; (iv) about 300-400 kHz; (v) about 400-500 kHz; (vi) about 0.5-1.0 MHz; (vii) about 1.0-1.5 MHz; (viii) about 1.5-2.0 MHz; (ix) about 2.0-2.5 MHz; (x) about 2.5-3.0 MHz; (xi) about 3.0-3.5 MHz; (xii) about 3.5-4.0 MHz; (xiii) about 4.0-4.5 MHz; (xiv) about 4.5-5.0 MHz; (xv) about 5.0-5.5 MHz; (xvi) about MHz; (xvii) about 6.0-6.5 MHz; (xviii) about 6.5-7.0 MHz; (xix) about 7.0-7.5 MHz; (xx) about 7.5-8.0 MHz; (xxi) about 8.0-8.5 MHz; (xxii) about 8.5-9.0 MHz; (xxiii) about 9.0-9.5 MHz; (xxiv) about 9.5-10.0 MHz; and (xxv) >about 10.0 MHz.

The spectrometer may comprise a chromatography or other separation device upstream of an ion source. The chromatography separation device may comprise a liquid chromatography or gas chromatography device. Alternatively, the separation device may comprise: (i) a Capillary Electrophoresis ("CE") separation device; (ii) a Capillary Electrochromatography ("CEC") separation device; (iii) a substantially rigid ceramic-based multilayer microfluidic substrate ("ceramic tile") separation device; or (iv) a supercritical fluid chromatography separation device.

The ion guide may be maintained at a pressure selected from the group consisting of: (i) <about 0.0001 mbar; (ii) about 0.0001-0.001 mbar; (iii) about 0.001-0.01 mbar; (iv) about 0.01-mbar; (v) about 0.1-1 mbar; (vi) about 1-10 mbar; (vii) about 10-100 mbar; (viii) about 100-1000 mbar; and (ix)>about 1000 mbar.

Analyte ions may be subjected to Electron Transfer Dissociation ("ETD") fragmentation in an Electron Transfer Dissociation fragmentation device. Analyte ions may be caused to interact with ETD reagent ions within an ion guide or fragmentation device.

A chromatography detector may be provided, wherein the chromatography detector comprises either: a destructive chromatography detector optionally selected from the group consisting of (i) a Flame Ionization Detector (FID); (ii) an aerosol-based detector or Nano Quantity Analyte Detector (NQAD); (iii) a Flame Photometric Detector (FPD); (iv) an Atomic-Emission Detector (AED); (v) a Nitrogen Phosphorus Detector (NPD); and (vi) an Evaporative Light Scattering Detector (ELSD); or a non-destructive chromatography detector optionally selected from the group consisting of: (i) a fixed or variable wavelength UV detector; (ii) a Thermal Conductivity Detector (TCD); (iii) a fluorescence detector; (iv) an Electron Capture Detector (ECD); (v) a conductivity monitor; (vi) a Photoionization Detector (PID); (vii) a Refractive Index Detector (RID); (viii) a radio flow detector; and (ix) a chiral detector.

The spectrometer may be operated in various modes of operation including a mass spectrometry ("MS") mode of operation; a tandem mass spectrometry ("MS/MS") mode of operation; a mode of operation in which parent or precursor ions are alternatively fragmented or reacted so as to produce fragment or product ions, and not fragmented or reacted or fragmented or reacted to a lesser degree; a Multiple Reaction Monitoring ("MRM") mode of operation; a Data Dependent Analysis ("DDA") mode of operation; a Data Independent Analysis ("DIA") mode of operation a Quantification mode of operation or an Ion Mobility Spectrometry ("IMS") mode of operation.

BRIEF DESCRIPTION OF THE DRAWINGS

Various embodiments will now be described, by way of example only, and with reference to the accompanying drawings in which.

DETAILED DESCRIPTION

Figure 1:
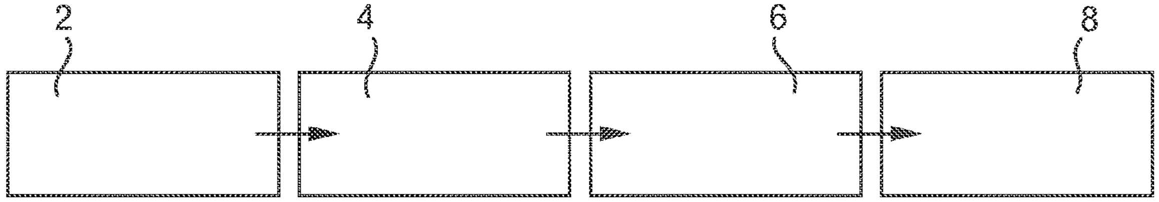
FIG. 1 shows a schematic of an instrument according to an embodiment of the present invention.

FIG. 1 shows a schematic of an instrument according to an embodiment of the present invention, which may be operated in a mode of acquisition that will be referred to herein as 2D-MSMS. The instrument comprises an ion source 2, a resolving mass filter or mass separator 4, a fragmentation device 6 and a mass analyser 8.

A 2D-MSMS mode of acquisition will now be described. Ions are generated from a sample by the ion source 2. The sample may comprise multiple components which may be separated by a separation device prior to being passed to the ion source 2. For example, the instrument may comprise a liquid chromatography device or capillary electrophoresis device for separating components of a liquid sample prior to ionisation in the ion source 2, or the instrument may comprise a gas chromatography device for separating components of a gaseous sample prior to ionisation in the ion source 2. Alternatively, the sample may be ionised without pre-separation. For example, the sample may be ionised directly by use of direct ionisation techniques, such as DART, REIMS, DESI or MALDI.

Once ions have been generated from the sample they are transmitted into the mass separator or mass filter 4. The mass separator or filter 4 is operated such that it transmits ions having only a single mass to charge ratio, or a limited window of mass to charge ratios, at any given time to the fragmentation device 6. The mass separator or filter 4 is operated such that the single mass to charge ratio, or window of mass to charge ratios, that is transmitted to the fragmentation device 6 varies with time. For example, the mass separator or filter 4 may continuously scan or step the mass to charge ratio, or window of mass to charge ratios, that is transmitted as a function of time. The mass separator or filter 4 may perform a plurality of cycles, in a single experimental run, wherein each cycle comprises continuously scanning or stepping the mass to charge ratio, or window of mass to charge ratios, that is transmitted as a function of time. The mass to charge ratio(s) may therefore be repeatedly scanned or stepped over a target range of mass to charge ratios.

An example device suitable to be used as the mass separator 4 includes an ion trap, such as a 3D quadrupole ion trap, Paul trap or linear ion trap. The ion trap may mass selectively eject ions, wherein the mass to charge ratios ejected by the ion trap to the fragmentation device 6 varies as a function of time, e.g., is scanned or stepped in each cycle. This may be achieved by varying one or more voltages applied to the ion trap as a function of time. An example device suitable to be used as the mass filter 4 includes a quadrupole mass filter. The mass filter may filter out all ions other than those transmitted to the fragmentation device 6 at any given time. One or more voltages applied to the mass filter may be varied as a function of time such that the mass to charge ratio(s) of the ion(s) that are transmitted by the filter is varied with time, e.g., is scanned or stepped in each cycle.

Ions that are transmitted by the mass separator or filter 4 pass into the fragmentation device 6 and are fragmented so as to produce fragment ions. Additionally, or alternatively to the fragmentation device 6, the ions transmitted by the mass separator or filter 4 may pass into a reaction device 6 and may be reacted so as to produce product ions. For example, the analyte ions may be reacted with reagent ions, electrons or molecules in the reaction device to cause them to form the product ions. Although embodiments described herein are described as comprising a fragmentation device, it is contemplated that these embodiments may alternatively, or additionally, comprise a reaction device.

Ions within the fragmentation device 6 are then transmitted downstream to the mass analyser 8, in which they are mass analysed. The mass analyser acquires a plurality of mass spectra within each cycle (e.g. within each scan) of the mass separator or filter 4. The mass analyser 8 may be an analyser that analyses ions in a short enough time scale to profile the ions being scanned or stepped out of the mass filter or separator 4 (e.g., typically tens of microseconds), which in turn may be profiling a fast chromatographic experiment. For example, the mass analyser 8 may be an orthogonal acceleration time of flight (oa-ToF) analyser.

Figure 2:
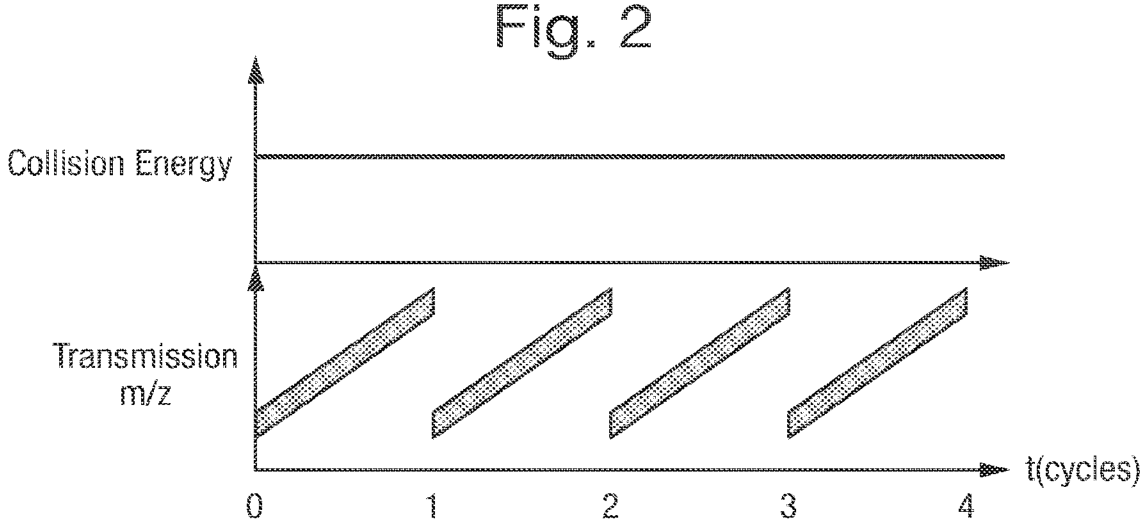
FIG. 2 shows a schematic of an embodiment in which all ions are fragmented.

FIG. 2 illustrates one possible mode of operation of the instrument shown in FIG. 1. According to this mode, the mass separator or filter 4 is scanned in each of a plurality of cycles. Four cycles are shown in FIG. 2 as diagonal bands, although fewer or more cycles may be performed. Each diagonal band represents the mass to charge ratios capable of being transmitted by the mass separator or filter 4 as a function of time. Ions falling outside of this band are not transmitted by the mass separator or filter 4. It can be seen that in this embodiment the mass to charge ratios capable of being transmitted by the mass separator or filter 4 increase with time from the start to the end of each cycle. In this embodiment the scan function is the same in each cycle, although it is contemplates that the scan functions may be different in different cycles. In the embodiment shown in FIG. 2, each cycle is substantially immediately followed by the next cycle, although it is also contemplated that there may be a time delay between one or more adjacent cycles. All ions scanned out of the mass separator or filter 4 (at all times) are caused to pass into the fragmentation device 6 with a constant collision energy, represented by the horizontal plot in the upper part of FIG. 2. The ions are then fragmented in the fragmentation device 6 via this collision energy and pass into the mass analyser 8. The mass analyser 8 repeatedly mass analyses ions received from the fragmentation device 6 for each cycle of the mass separator or filter 4, thereby obtaining a plurality of mass spectra for each cycle of the mass separator or filter 4. For example, in the illustrated example the mass analyser 8 acquire 200 mass spectra for each cycle of the mass separator or filter 4, although it is contemplated that a fewer or greater number of mass spectra may be obtained in each cycle.

The plurality of mass spectra obtained for each cycle may be obtained over a relatively short timescale, e.g. in only 1/10 second. The timescale, and hence the rate of obtaining the mass spectra, is selected to be sufficiently fast to profile the sample being scanned out of the mass separator or filter 4. As mentioned previously, the sample may be separated upstream of the ion source 2 by chromatography, for example, high performance chromatography (e.g. HPLC). In these embodiments, the time of each cycle of the mass separator or filter 4 may be selected to be sufficiently fast to profile the sample eluting from the chromatography device. The timescale, and hence the rate of obtaining the mass spectra, may be selected to be sufficiently fast to profile the sample eluting from the chromatography device and being scanned out of the mass separator or filter.

In addition to speed, another benefit of this acquisition mode is that a measurement of a characteristic filter or separator position may be made for each fragment ion. This position measurement may have a precision that is much smaller than the instantaneous width of the filter or separator window. This may be used, for example, to more accurately determine the time that that the precursor ion of the fragment ion was transmitted by the mass separator or filter 4. This time may be used to determine the mass to charge ratio of the precursor ion, using knowledge of how the mass to charge ratio transmission function of the mass separator or filter 4 varies with time.

A number of modifications or improvements to the basic 2D-MSMS acquisition mode are described herein.

The time that the mass analyser 8 detects any given fragment ion may be used to determine or estimate the time that its corresponding precursor ion was transmitted by the mass filter or separator 4. As the mass to charge ratio transmission window of the mass filter or separator 4 is varied with time, the time that the precursor ion was transmitted by the mass filter or separator 4 may be used to determine or estimate the mass to charge ratio of the precursor ion. The technique described above may enable the mass to charge ratio of a precursor ion that corresponds to a particular mass analysed fragment species to be reconstructed to an accuracy of a fraction of the transmission window of the mass filter or separator 4. However, it is often desirable to obtain a more accurate measurement of mass to charge ratio for a precursor, for example, for the purpose of databank or library searching, e.g., for mass confirmation in a screening experiment etc.

Embodiments wherein both low fragmentation energy data and high fragmentation energy data are obtained in alternating fashion, as in some multi-MS experiments, will now be described. Such embodiments may be used to achieve a more accurate measurement of mass to charge ratio for a precursor ion.

Figure 3A:
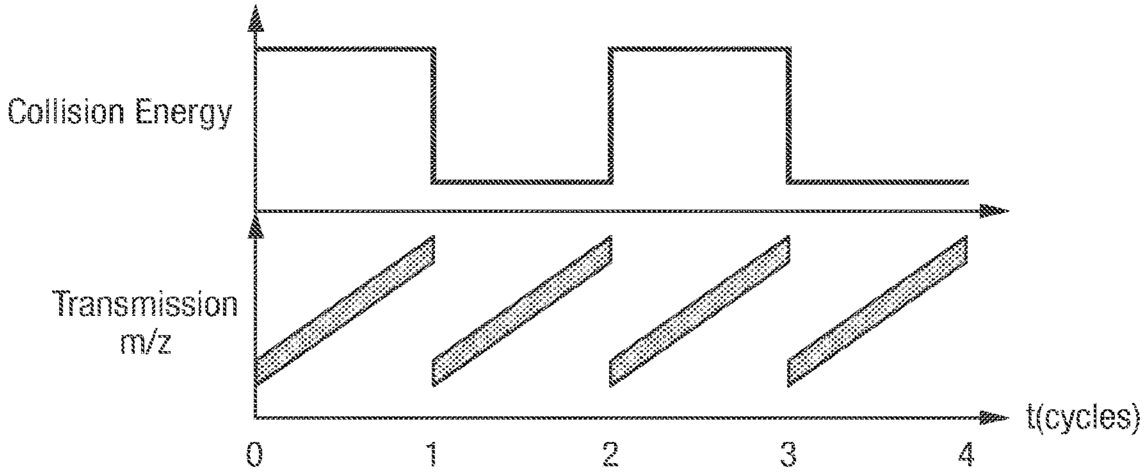
FIGS. 3A-3I shows schematics and data from an embodiment which alternates between a fragmentation mode and a non-fragmentation mode.

FIG. 3A illustrates a mode of operation that is the same as that described in relation to FIG. 2, except that the ions are transmitted into the fragmentation device 6 with a collision energy that is high for some cycles of the mass filter or separator 4 (e.g. such that the precursor ions are fragmented) and low for other cycles of the mass filter or separator 4 (e.g. such that the precursor ions are substantially not fragmented). In the depicted embodiment, the collision energy is high for alternate cycles of the mass filter or separator 4 and low for other alternate cycles of the mass filter or separator 4, although other patterns of variation in collision energy are contemplated. For example, the collision energy may be high for a plurality of successive cycles and then low for at least one subsequent cycle, or the collision energy may be low for a plurality of successive cycles and then high for at least one subsequent cycle. In these embodiments both the low and high collision energy data may be obtained for mass filter or separator 4 scans that are scanned in an identical fashion. This has the advantage that both low energy data and high energy data can be processed in an identical way. Precursor ions can be associated with their respective fragment ions based on correlation or probabilistic comparisons of low and high energy peak profiles. In embodiments with low and high collision energies, the low energy data and high energy data may be stored in different data streams.

Figure 3B:
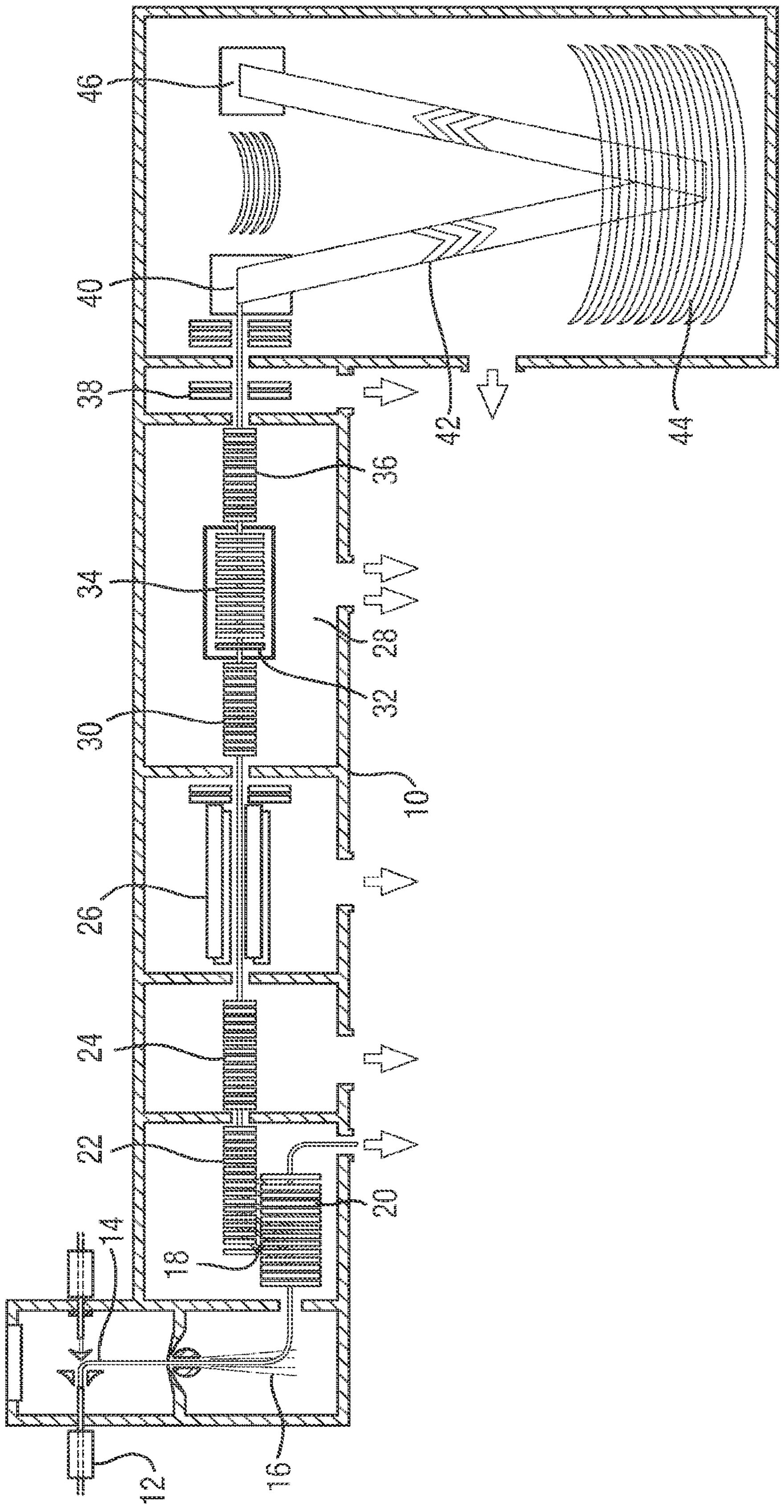

An example of the embodiment operating in the mode shown in FIG. 3A will now be described. A Waters Synapt G2-Si Q-ToF, illustrated schematically in FIG. 3B, was used. The instrument is conventionally operated by injecting a sample from a liquid chromatography separator into the instrument at the injection inlet 12. The sample is sprayed from a needle into the ionisation chamber 14. Ionisation of the sample occurs so as to form sample ions. The ionised sample passes out of the ionisation chamber and the ions flow towards a first vacuum region 16. The ions are transferred through the first vacuum region 16 and into an ion guide 18. The ion guide initially guides the ions along a section having a relatively large cross-sectional area 20 and then focusses the ions into a smaller cross-sectional area in an off-axis section 22. The ions are then be transferred into a further ion guide 24 and into a quadrupole mass filter 26. The quadrupole mass filter 26 can be operated in a transmission mode so that all the ions entering the filter 26 pass through it and into the downstream chamber 28. The ions are then collected in bunches within a trap cell 30 within the chamber 28. Each bunch of ions in the trap cell is pulsed into a helium cell 32 of an ion mobility separator 34. The ions temporally separate according to their ion mobility within the mobility separator 34. This enables different precursor ions that elute from the liquid chromatography separator at the same time to be separated according to ion mobility (i.e. according to drift time through the mobility separator 34). As the ions exit the separator 34 they are passed through a transfer cell 36, several lenses 38 and into a ToF pusher region 40 of an orthogonal acceleration ToF mass analyser. The pusher region 40 may be pulsed a plurality of times as ions originating from each bunch elute from the separator 34. As such, groups of ions having small ranges of ion mobility are pulsed into a flight tube 42 and reflectron 44, in which they are reflected to a detection system 46. The flight times of the ions from the pusher 40 to the detection system 46 are recorded, together with a respective ion mobility value representative of their ion mobility through the ion mobility separator 34. Although the instrument has been described in a mode for analysing precursor ions, the instrument may also be used in a fragmentation mode in which the precursor ions are provided to the transfer cell 36 with sufficient energy to induce fragmentation of these ions. The resulting fragment ions are maintained separated according to the mobility of their respective precursor ions through separator 34, and are then mass analysed by the ToF mass analyser as described above. As such, the fragment ions are associated with ion mobility values corresponding to the ion mobilities of their respective precursor ions.

The Synapt instrument was modified so that the quadrupole mass filter was allowed to operate with a mass to charge ratio transmission window of up to 100 Da/e. A 1600 μg cytosolic *E. coli* tryptic digest standard was injected into a nano-LC system equipped with a C18 analytical reversed phase column (upstream of inlet 12). A gradient duration of 120 mins was used. The eluting sample was transferred to the inlet 12. The transmission of the instrument was set to 10% using a dynamic range enhancement (DRE) lens. (For comparison, an $MS^E$ experiment was performed using the same sample and loading but at 0.5% transmission.) The quadrupole was set to transmit a 100 m/z unit window which was continuously and repetitively scanned with a one second cycle time over the m/z range of 50-2000, in accordance with the scan function shown in FIG. 3A. At the end of each quadrupole cycle the instrument was switched between the post-quadrupole high collision energy fragmentation mode (in the transfer cell 36) and the low collision energy non-fragmentation mode.

The data acquisition system was configured to profile the ion mobility separations performed by the ion mobility separator 34 by adding individual ToF spectra (pushes) incrementally into a buffer containing 200 memory locations or 'bins'. In other words, for each bunch of ions pulsed into the ion mobility separator 34, the ToF pusher region 40 was pulsed 200 times so as to mass analyse the ions emerging from the separator 34, or to mass analyse ions derived therefrom (i.e. their fragment ions, in the high collision energy fragmentation mode). In the low energy non-fragmentation mode the precursor ions arrive at the ToF pusher region 40 at times related to their ion mobility through the separator 34. In the high energy fragmentation mode, the fragment ions arrive at the ToF pusher region 40 at times related to the ion mobility through the separator 34 of their respective parent ions. As such, each of the bins stores spectral data for ions associated with different drift times through the separator 34. The pusher period was determined by the ToF mode and mass range, and in this example was typically around 70 μs, corresponding to an ion mobility separation of 14 ms (i.e. 200 pushes per ion mobility separation cycle). Data may be added to the buffer in a cyclic fashion. For example, for each cycle of a plurality of cycles, data from the nth ToF pulse may be added to the nth bin so that the nth bin includes spectral data from the nth ToF pulse of all of the cycles. It is contemplated that at least 10 cycles may be added to the buffer before being read out and stored to disk as a two-dimensional data set (i.e. both the mass data and associated ion mobility data are read out).

Although the above example has been described as having 200 memory bins and 200 ToF pulses for each ion mobility separation, it is contemplated that different numbers of bins and ToF pulses may be employed.

The acquisition system may be repurposed to add data from several consecutive pushes (for a given cycle) to the same spectral bin in the buffer before moving on to the next bin. For example, in the above example the data is stored in 200 bins, and so the number of consecutive ToF pushes per bin may be set to be the number of pushes in 1/200th of the quadrupole cycle time (if there is no inter-scan delay between pushes). The quadrupole cycle time may be chosen to be, for example, about 1 s, and so in this example the number of consecutive pushes added to each bin would be about 70.

As each bin contains mass spectral data from the ToF mass analyser and is also associated with a drift time of the precursor ions through the ion mobility separator 34, this setup produces two-dimensional datasets resembling nested ion mobility (IMS)-MS data. The spectral data may also be associated with its respective retention time from the liquid chromatography separator. The data may be viewed using Driftscope, for example, as shown in FIGS. 3C and 3D.

Figure 3C:
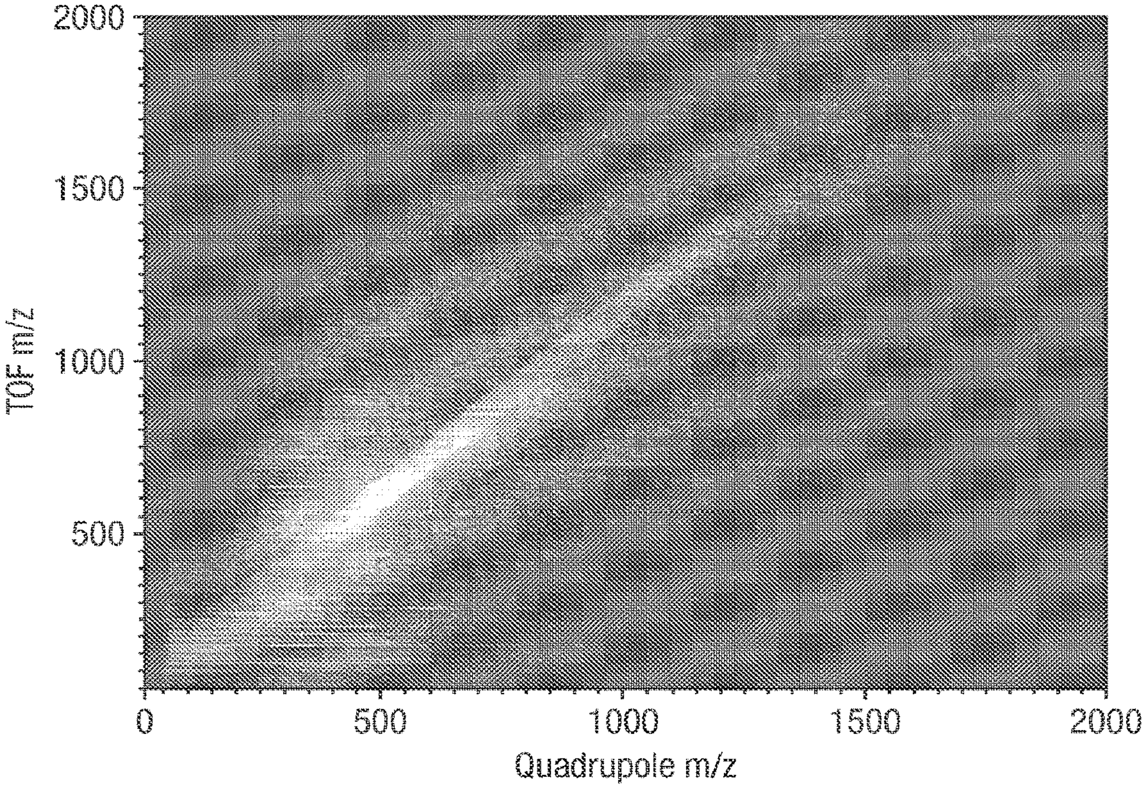
Figure 3D:
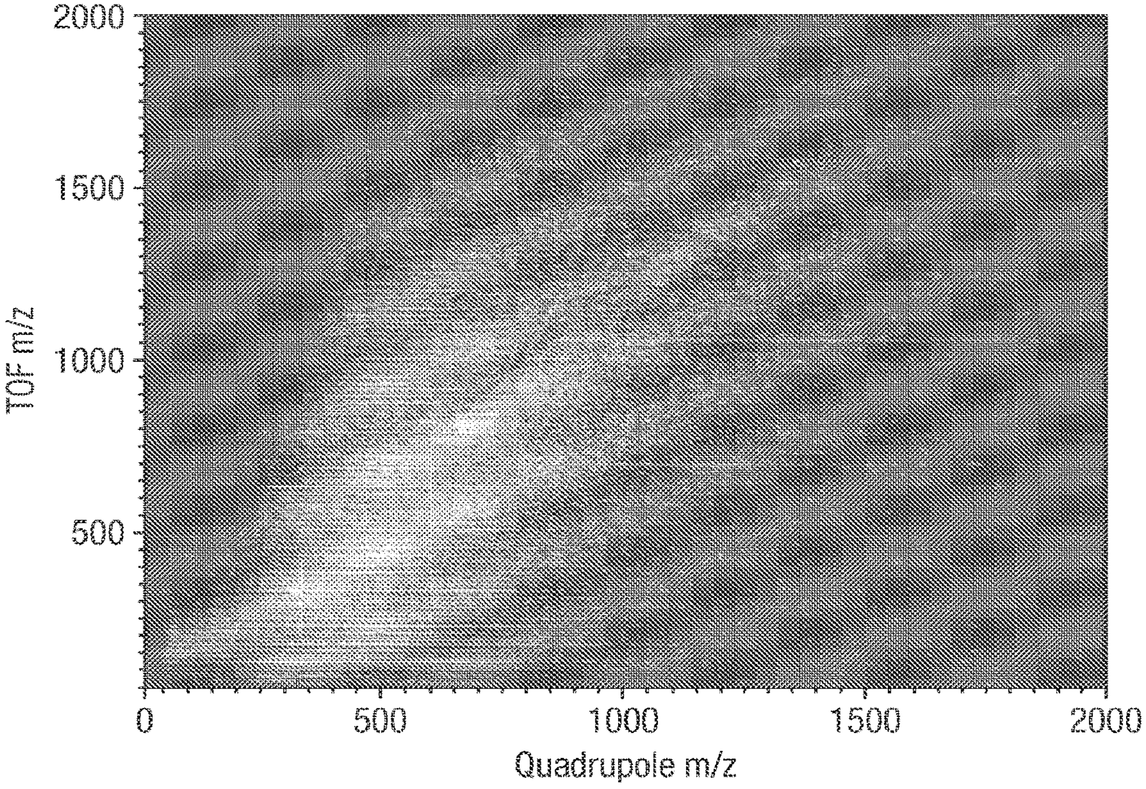

In the plots of FIGS. 3C and 3D, the horizontal axis represents the centre of the quadrupole transmission window while the vertical axis represents the mass to charge ratio value recorded by the ToF mass analyser. The low collision energy data is represented by FIG. 3C, which shows a largely diagonal structure representing the precursor ions transmitted by the quadrupole and recorded by the ToF mass analyser. Some fragmentation at low mass to charge ratios is also visible in this log-intensity heat map. The high collision energy data is represented by FIG. 3D, wherein the residual diagonal structure corresponds to unfragmented precursor ions, but the additional scatter above and below this line arises from fragmentation.

Using software tools developed to extract drift plots from the IMS-MS data, reconstructed quadrupole mass spectra can be extracted for a given ToF mass to charge ratio and retention time. In this experiment, fragmentation was induced downstream of the scanned quadrupole and so the profiles of the reconstructed spectra should be (limited only by ion statistics) substantially the same for a precursor and its fragments. This opens up the possibility of precursor and fragment alignment with a tolerance much tighter than the width of the quadrupole window (analogous to retention time and drift time alignment in $MS^E$ and $HDMS^E$ experiments). The two-dimensional data produced by the experiment described herein may be stored using the same format as an $HDMS^E$ experiments, and the data may be processed and searched directly using an unmodified copy of ProteinLynx Global Server (PLGS) v3.0.1.

The low-energy peak list produced by PLGS may be filtered by intensity, and using a simple linear fit, the relationship between mass to charge ratio and bin number b was determined to be: m/z=10.996 b+73.9. Using this transformation, every high energy ion detected by PLGS can be reported as a triplet of: RT, precursor m/z and fragment m/z.

To investigate the accuracy of the precursor mass to charge ratio assignment, two PLGS detected isotopes were examined for each of seven fragment y-ions of an abundant *E. coli* peptide VIELQGIAGTSAAR (FIGS. 3E-F and FIGS. 3G-H). The average calculated precursor mass to charge ratio value and uncertainty was 693.2+/−4.2. The theoretical mass to charge ratio for the 2+ charge state of this peptide is 693.4. In this case, the mass to charge ratio of the precursor was therefore determined to better than 10% of the quadrupole peak width.

Figure 3E:
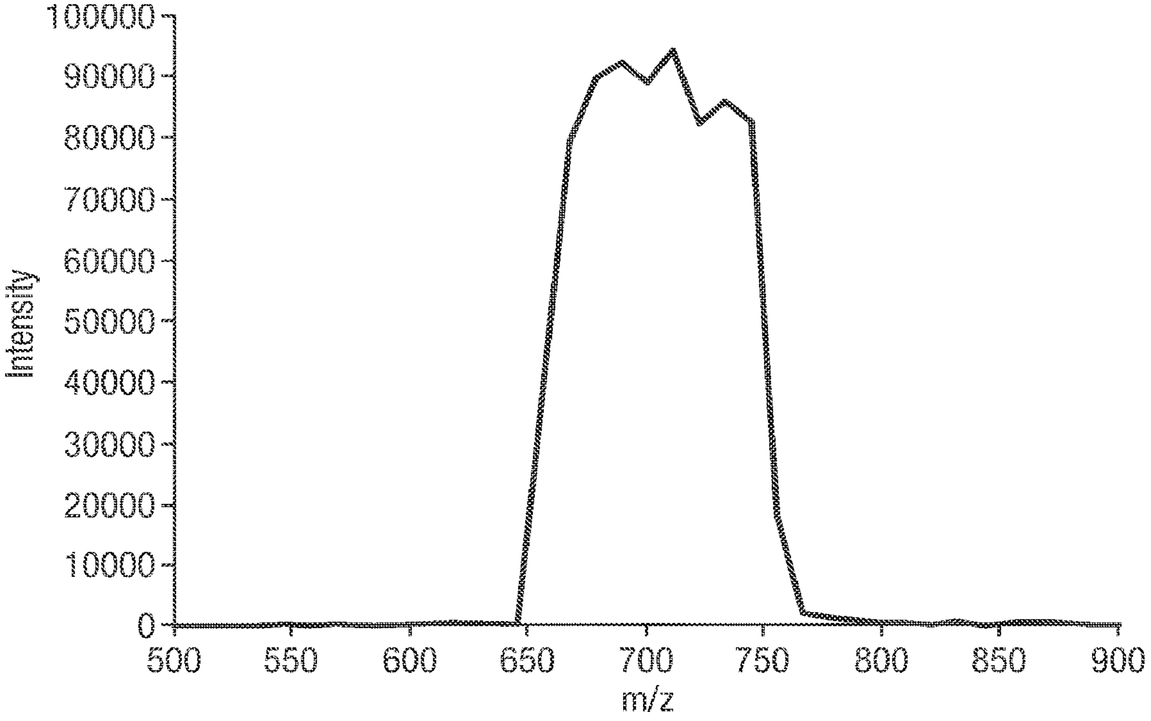
Figure 3F:
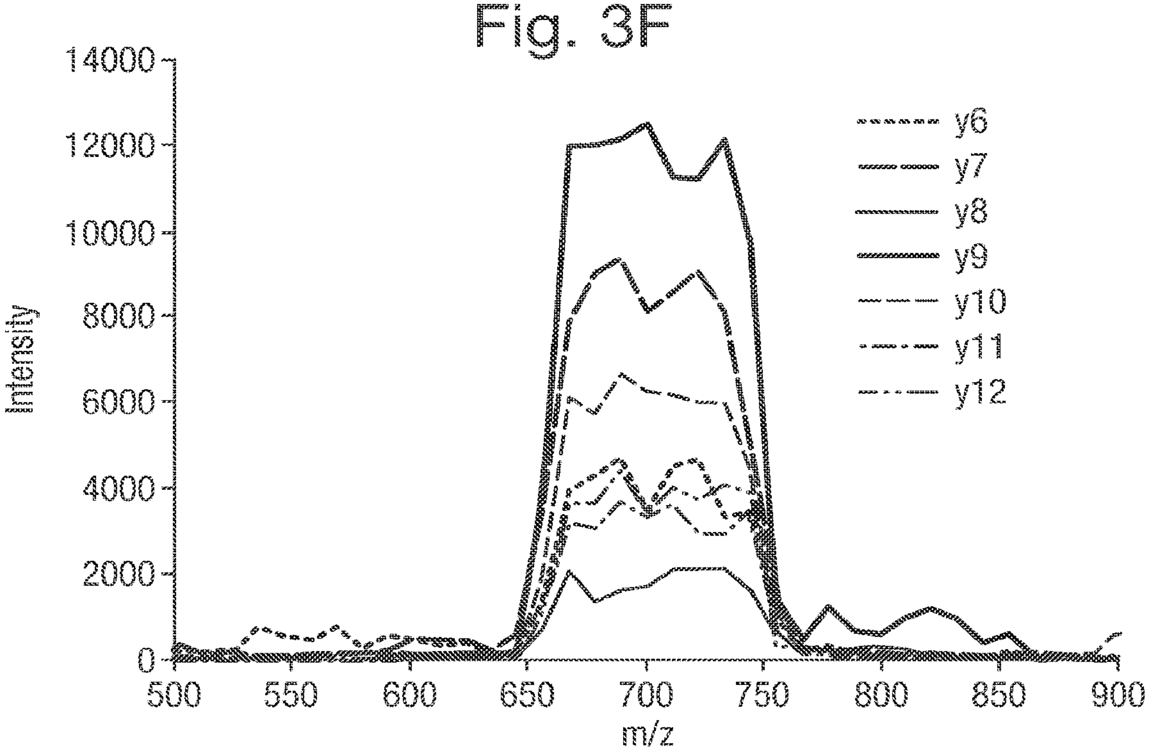

More specifically, FIG. 3E shows the reconstructed quadrupole profile for the precursor ion of the doubly charged peptide VIELQGIAGTSAAR and FIG. 3F shows the reconstructed quadrupole profiles of seven of its fragment ions. Using only fragment ion isotope information, the inferred precursor m/z is 693.2+/−4.2, whereas as described above the true value is 693.4.

Figure 3G:
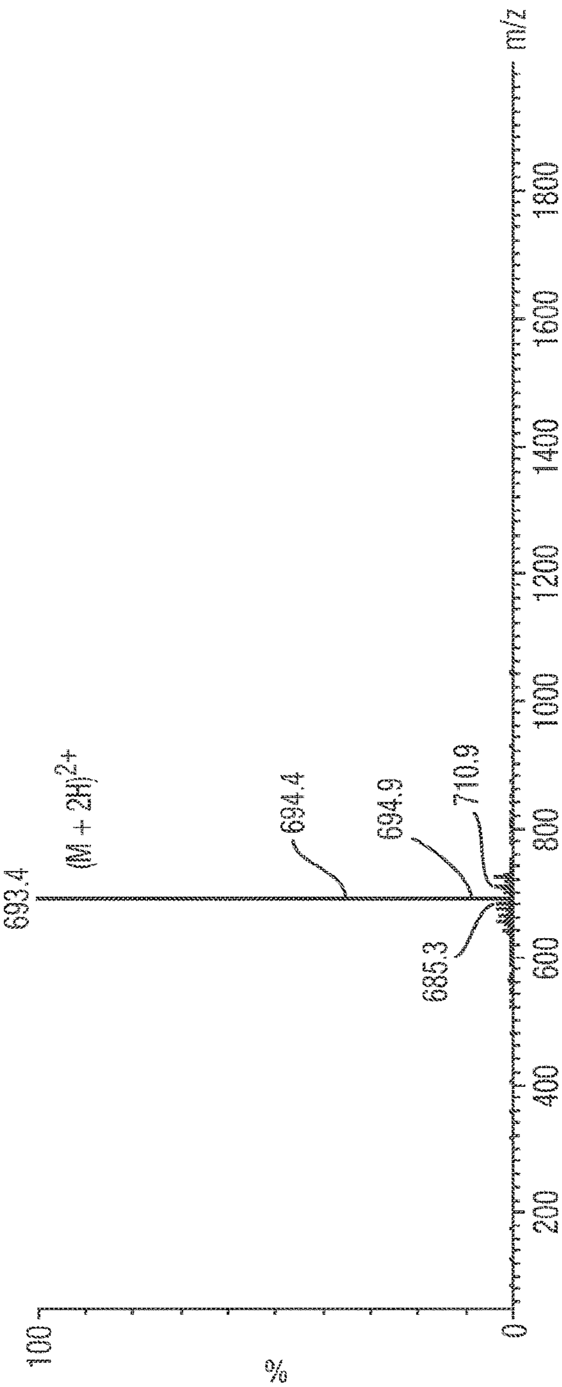
Figure 3H:
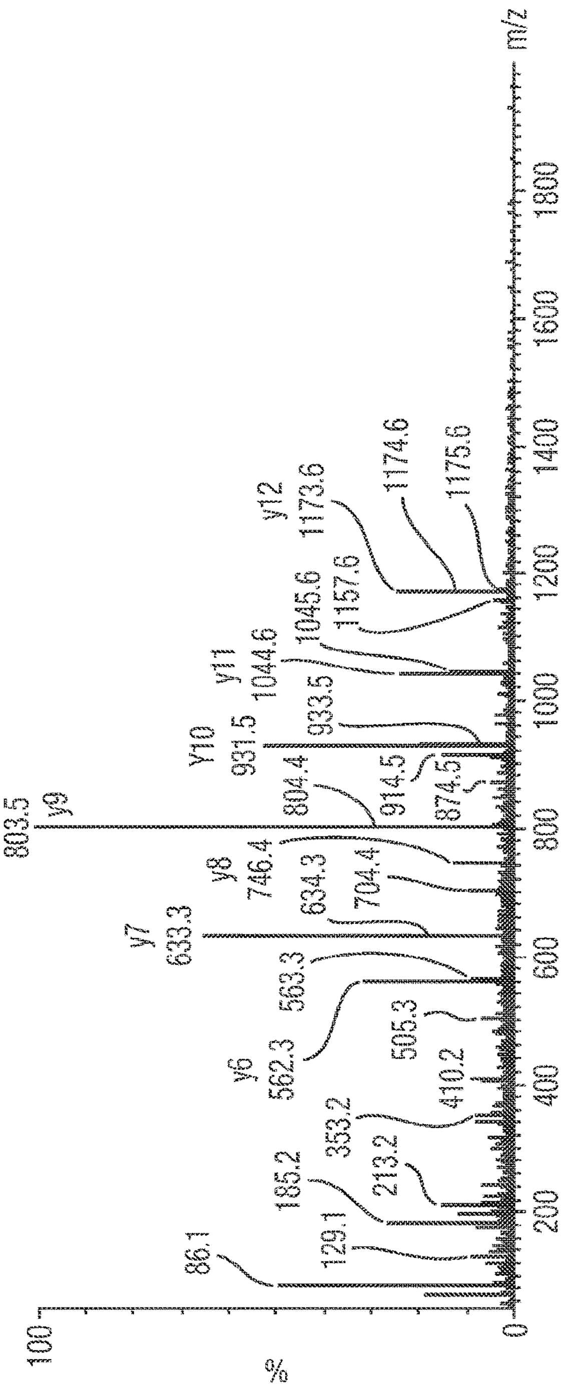

FIG. 3G shows the low energy spectrum at a retention time of 41.6 minutes and a quadrupole m/z of 693.4. The doubly charged precursor of the peptide VIELQGIAGTSAAR is clearly visible. FIG. 3H shows the corresponding high energy spectrum, in which part of the y-ion series of the same peptide is annotated.

The data were searched against an *E. coli* database using the Ion Accounting algorithm in PLGS 3.0.1 at a 1% false discovery rate. The search produced 343 proteins and 3773 peptide matches.

Given the 10% transmission of the instrument and the duty cycle resulting from scanning the quadrupole (~5%), the effective loading was about 8 ng which is similar to the effective loading for the $MS^E$ experiment run at 0.5% transmission. The $MS^E$ data yielded 286 proteins and 2568 peptide matches.

After compensating for relative duty cycle, the acquisition method disclosed herein significantly outperforms $MS^E$ in a qualitative proteomics setting. This indicates that at least some of the benefits seen in qualitative ion mobility experiments (e.g., $HDMS^E$) could be realised through data independent tandem modes on non-IMS enabled instruments.

As described herein, the methods of operations may be modified in a number of ways. For example, wideband enhancement (utilising post-quadrupole ion mobility separation) could be employed, e.g., to improve the mass analyser duty cycle by up to, for example, 10-fold for singly charged fragment ions.

The collision energy may be varied over the mass separator or filter cycle, e.g., using an optimised value or ramp at each mass to charge ratio being transmitted, thereby improving fragmentation efficiency.

The peak detection algorithm (e.g., in PLGS) may be optimised for ion mobility peak shapes, rather than the more square mass separator or filter profiles shown herein. Further tuning may improve alignment.

A fixed mass separator or filter 4 scanning speed and window size has been described. However, much of the mass to charge ratio range covered by the mass separator or filter may be empty, e.g., tryptic peptides tend to be concentrated between m/z 300-900. Mass ranges having species therein could be traversed more slowly and/or with a narrower m/z transmission window. The mass separator or filter programme could also be varied as a function of retention time (and, therefore, sample composition and complexity).

In the example described, the use of the fast ion mobility acquisition system allows two-dimensional data sets to be acquired at, for example, up to 10 Hz (i.e. a spectral acquisition rate of 2000 spectra per second), facilitating the profiling of faster chromatographic separations.

The method could also be implemented on instruments other than that described above, such as the Waters Xevo-QTOF and the Vion IMS-QTOF which both have similar acquisition systems to Synapt. For example, the positioning of the quadrupole after the ion mobility cell in Vion enables a different mode in which the quadrupole is programmed to scan along a trend line in drift time-m/z space corresponding to a single charge state. With a suitable choice of isolation width, a significantly improved duty cycle would result.

Similarly, the method is well-suited to any trap-TOF geometry in which ions can be released from the trap in order of m/z and subsequently fragmented. With this configuration, duty cycles approaching 100% are possible.

Recently, methods in which a resolving quadrupole is moved across the m/z range, typically in steps of 25-50 m/z units, have become popular in quantitative applications. The use of such a narrow isolation window results in significant loss of ions, and precursors are only located to within the isolation width. In applications such as these, the use larger transmission windows with or without low energy or survey data would yield a relative improvement in sensitivity at the same time as an improvement in the accuracy of the inferred precursor mass. For example, the use of a 100 m/z unit transmission window would yield a relative 2-4 fold improvement in sensitivity at the same time as a 3-6 fold improvement in the accuracy of the inferred precursor mass.

Figure 3I:
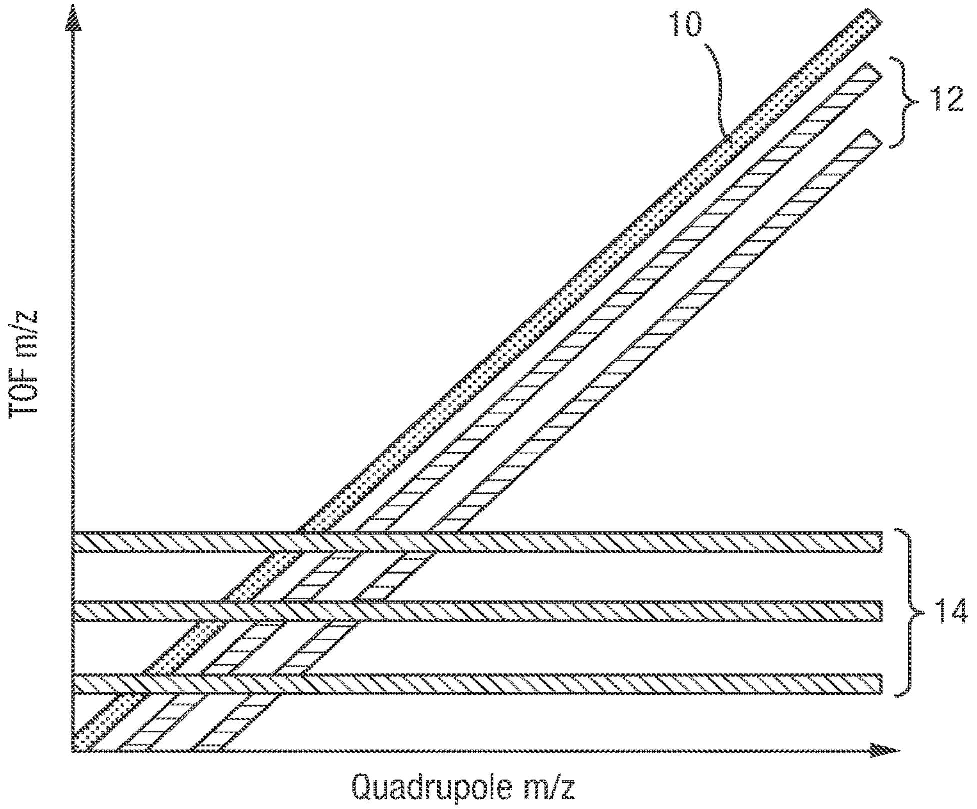

FIG. 3I illustrates some of the types of ions observed in 2D-MSMS experiments described herein. Band 10 represents precursor ions, bands 12 represent ions formed due to neutral losses, and bands 14 represent common fragments. In further applications, reconstructed mass separator or filter spectra (e.g., quadrupole spectra) can be used for precursor ion discovery and/or 2D patterns can be used in library searching.

In various embodiments it may be desired to operate the mass separator or filter 4 in a wideband mode (i.e. a substantially non-resolving mode), or to avoid trapping or filtering altogether, during the acquisition of the low collision energy data. In the case of a mass separator, this reduces the instantaneous ion current, reducing the likelihood or extent of detector saturation.

Figure 4:
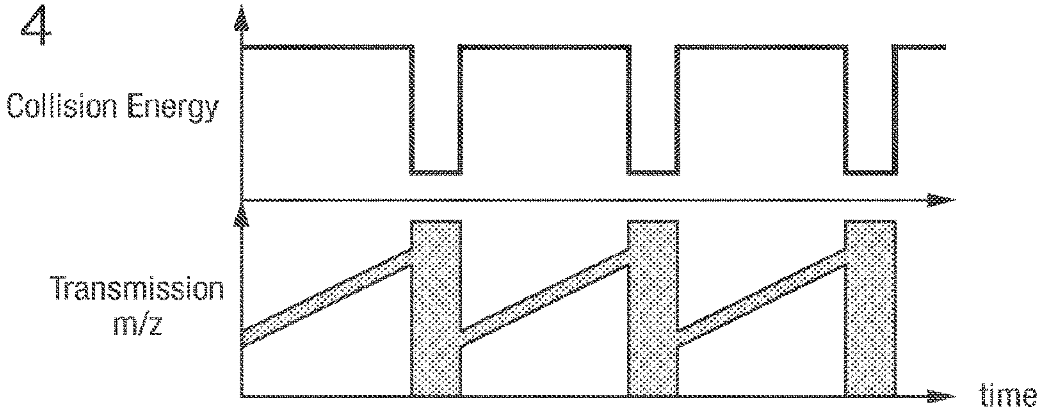
FIG. 4 shows a schematic of an embodiment in which wideband modes are operated between scans.

FIG. 4 illustrates another possible mode of operation of the instrument shown in FIG. 1. According to this mode, the mass separator or filter 4 is scanned in each of a plurality of cycles. All ions scanned out of the mass separator or filter 4 during each cycle are caused to pass into the fragmentation device 6 with a relatively high constant collision energy, as shown in the upper plot in FIG. 4. These ions are then fragmented in the fragmentation device 6 and pass into the mass analyser 8 for mass analysis. As described in the embodiments above, the mass analyser 8 may repeatedly mass analyse ions received from the fragmentation device for each cycle of the mass separator or filter, thereby obtaining a plurality of mass spectra for each cycle of the mass separator or filter 4. However, for a period of time between adjacent cycles of the mass separator or filter 4, all ions are allowed to be onwardly transmitted from the ion source 2 to the mass analyser 8. In other words, the mass separator or filter 4 is operated in a wideband mode that does not separate or filter the ions for a period of time between adjacent scanning cycles of the mass separator or filter 4. During these periods of time, the ions may be caused to pass into the fragmentation device 6 with a relatively low constant collision energy, as shown in the upper plot in FIG. 4. These ions may substantially not be fragmented in these periods of time and the mass analyser 8 therefore mass analyses precursor ions.

This technique increases the ion signal for the low collision energy portion of the data, by not separating or filtering the ions. This improves ion detection limits and ion statistics for the detection of the precursor ions.

During the scanning cycles of the mass separator or filter 4 there is a loss of ions or a lowering of the ion signal due to the separation or filtering of ions. In order to compensate for this, the period of time over which the mass separator or filter 4 is scanned in any given cycle may be longer than the period of time between adjacent cycles in which all ions are transmitted. For example, the time spent acquiring high collision energy data for any given cycle of the mass separator or filter 4 may be longer than the time spent acquiring data in any given period of time between adjacent cycles in which all ions are transmitted. The ratio of time spent acquiring low collision energy data to time spent acquiring high collision energy data may be selected to be different for different types of analyse, e.g., so as to be optimised for different analyte types.

Although the scan functions of the cycles are depicted as the same, they may be different. Additionally, or alternatively, although the collision energy is the same for each cycle (per period between) the energy may be different for different cycles (or periods between).

Figure 5:
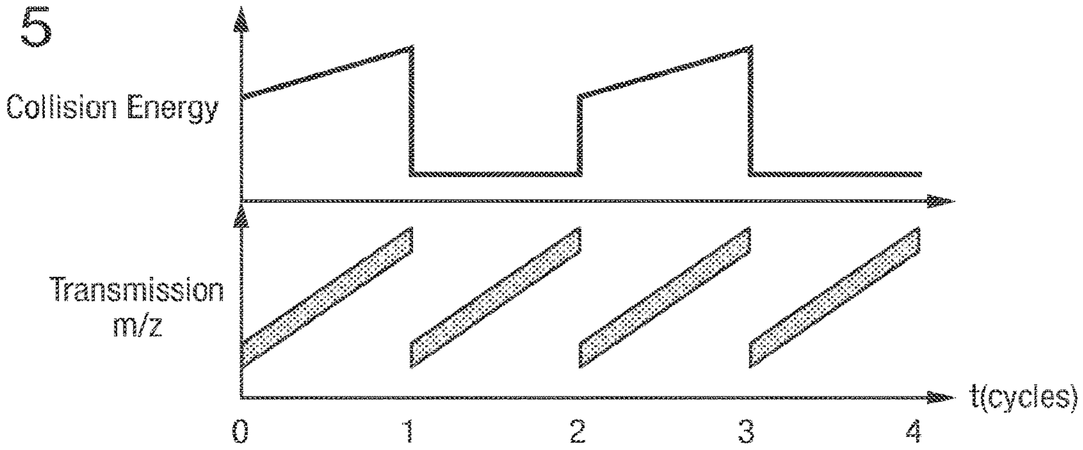
FIG. 5 shows a schematic of an embodiment in which the collision energy is ramped during each scan.

FIG. 5 illustrates a mode of operation that is the same as that described in relation to FIG. 3, except that during each mass separator or filter 4 cycle the ions are transmitted into the fragmentation device 6 with a collision energy that is progressively increased. This technique may be used to optimise or enhance the dissociation of different analyte precursor ions in the sample. For example, for some classes of analyte, such as complex mixtures of peptides, a single collision energy does not yield an optimal fragmentation pattern for all species. For this reason, the collision energy may be varied during each mass separator or filter cycle so that the collision energy is optimised or enhanced for the different species being transmitted to the fragmentation device 6 at different points in the cycle. The collision energy may be varied during each cycle such that the collision energy is optimised or enhanced for the mass to charge ratio(s) currently being transmitted from the mass separator or filter 4 to the fragmentation device 6. This technique is therefore particularly useful for classes of analyte for which there is a strong correlation between their mass to charge ratios and the optimal collision energy.

In the example shown in FIG. 5, the collision energy is ramped linearly during each cycle. However, the collision energy may be varied in each cycle in other manners. For example, the collision energy may be varied in each cycle as a function of time in a non-linear manner. The collision energy may be varied in each cycle as a function of time in a manner that increases progressively, increases in a continuous manner, increases in a stepped manner, decreases progressively, decreases in a continuous manner, decreases in a stepped manner, increases and then decreases, or decreases then increases. Functions of time including curves, steps or very rapid changes of collision energy may be used.

Even though the mass separator or filter 4 may transmit a particular mass to charge ratio, or a particular range of mass to charge ratios, at any point in mass separator or filter cycle, species with similar mass to charge ratios may have different optimal collision energies. It can therefore be beneficial to subject the ions to different collision energies at substantially the same point in each mass separator or filter cycle. This may be achieved by performing a plurality of cycles of varying the collision energy within each mass separator or filter cycle, e.g., by nesting a series of short collision energy ramps within each mass separator or filter cycle. It can also be beneficial to subject the ions to different collision energies at the same point in different cycles. For example, the collision energy may be varied in a different manner for different mass separator or filter cycles.

Figure 6:
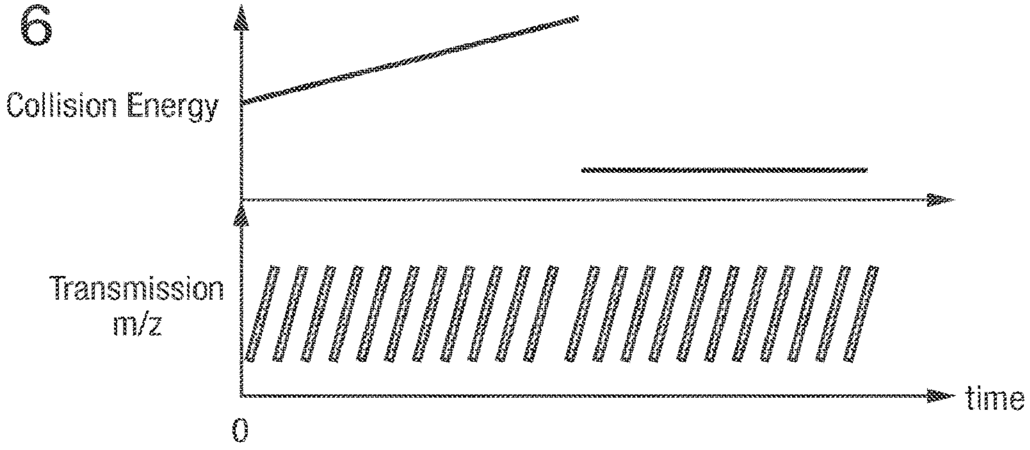
FIG. 6 shows a schematic of an embodiment in which the scan cycles are relatively frequent.

FIG. 6 illustrates a mode of operation wherein the mass separator or filter 4 is scanned relatively rapidly, i.e. such that each mass separator or filter cycle is relatively short. This mode may be useful, for example, when the mass separator or filter 4 is an ion trap that mass selectively scans ions out of the trap in each of the cycles, because the trap fill time is relatively low, which reduces the charge capacity requirement for the ion trap. In other words, the trap scans the ions out relatively frequently and so only a relatively low charge capacity ion trap is required. This may mean that a smaller or less expensive ion trap could be utilised.

The ions are scanned out of the mass separator or filter 4 (e.g., ion trap) and into the fragmentation device 6 with a certain collision energy at any given time, wherein the collision energy causes the ions to fragment in the fragmentation device 6. The collision energy may be varied as a function of time, for example, such that the collision energy is varied to different values over different mass separator or filter 4 cycles. The collision energy may be varied over the different cycles as a function of time in a manner that causes the ions scanned out of the mass separator or filter in the different cycles to be fragmented. The collision energy may be varied over the different cycles as a function of time in a manner that increases progressively, increases in a continuous manner, increases in a stepped manner, decreases progressively, decreases in a continuous manner, decreases in a stepped manner, increases and then decreases, or decreases then increases. Functions of time including curves, steps or very rapid changes of collision energy may be used. In the example shown in FIG. 6, the collision energy is varied over the different cycles as a function of time in a manner that increases progressively for eleven mass separator or filter cycles, so as to cause fragmentation of the ions scanned out of the mass separator or filter in these cycles.

This collision energy may also be set to a low energy value, or low energy values, for a plurality of different cycles of the mass separator or filter 4 so that ions scanned out of the mass separator or filter 4 in these cycles are not fragmented. In the example shown in FIG. 6, the collision energy set to such a low value for eleven mass separator or filter cycles, so that the ions are not fragmented in these cycles.

The choice of mass separator or filter resolution, or transmission window size, to be used may depend on the complexity of the sample being analysed. For simple mixtures, it may be beneficial to make use of a relatively wide transmission window in order to optimize ion transmission and/or reduce saturation. In contrast, for complex mixtures it may be beneficial to employ a relatively narrow transmission window so as to reduce the complexity of the data obtained at high collision energies, although this may be compromised by some cost in analytical dynamic range (i.e. loss of sensitivity or saturation).

As described above, embodiments of the invention may include a sample separation device upstream of the ion source 2, such as a liquid chromatography (LC) or gas chromatography device. In these embodiments the complexity and typical composition of the sample introduced into the ion source 2 of the mass spectrometer may vary significantly with time. The sample complexity may also vary with mass to charge ratio. For example, at an elution time from the sample separation device (e.g., at a given retention time during a chromatographic experiment), there may be portions of the mass to charge ratio range containing a relatively high concentration of precursor species, while other portions of the mass to charge ratio range may contain relatively few precursor species.

It may therefore be desired to vary the operation of the instrument as a function elution time from the sample separation device and/or mass to charge ratio, but still in a data independent way. For example the start and end of the mass range to be scanned over may vary according to the elution time from the sample separation device. Accordingly, different mass separator or filter cycles may scan over mass ranges having different start and/or end masses.

Similarly, the width of the mass separator or filter transmission window may be varied with elution time from the sample separation device. Accordingly, different mass separator or filter cycles may scan over mass ranges with transmission windows of different sizes.

Alternatively, or additionally, the width of the transmission window may vary during each of one of more of the mass separator or filter cycles. For example, the transmission window may be relatively narrow in one or more regions of the mass separator or filter cycle of high complexity (i.e. containing a relatively large number precursor species) and relatively wide in one or more regions of the mass separator or filter cycle that is of low complexity (i.e. containing a relatively low number of precursor ion species).

The duration over which a mass separator or filter cycle is performed may also be varied in the experimental run for different mass separator or filter cycles.

The collision energy may be set to a value, or values, that causes ions scanned out of the mass separator or filter 4 in at least some of the mass separator or filter cycles to be fragmented in the fragmentation device. Variations in the mass transmission window during a mass separator or filter cycle may be synchronised with variations in the collision energy.

The mass separator or filter cycle time and/or the proportions of time spent acquiring low and high energy collision data may also be varied during the experimental run.

The optimization of the various parameters of the instrument described above may be performed based on user experience, analysis of the contents of a library from which predictions can be made about species likely to be observed during the experimental run, or by analyzing previous experimental data.

According to the methods described herein, the collision energy and/or other experimental parameters may be synchronized with the mass separator or filter cycle and may be optimized. For example, optimal collision energy may be pre-calculated calculated on-the-fly using a pre-determined function of mass to charge range specific to an analyte class.

Figure 7:
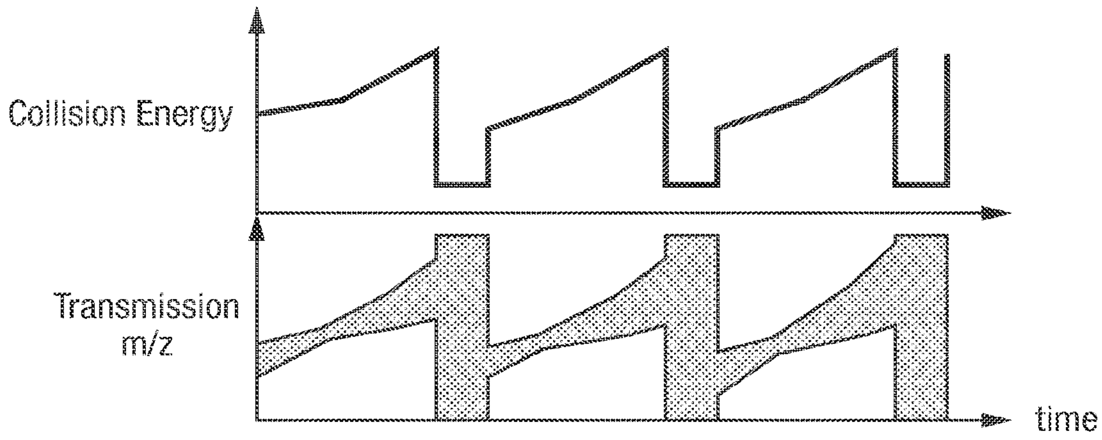
FIG. 7 shows a schematic of an embodiment wherein the width of the mass transmission window varies during each scan cycle and the range that the window is scanned varies in different scans.

FIG. 7 illustrates a mode of operation similar to that shown in FIG. 4, except that the width of the transmission window varies with time within each mass separator or filter cycle. Also, the mass range that the mass separator or filter 4 is scanned across varies between the different mass separator or filter cycles. In the example shown, the mass range scanned increases progressively for subsequent cycles, although it is contemplated that the mass range scanned in a cycle may decrease with time or vary in another manner. The value of the collision energy may vary within each mass separator or filter cycle, e.g. as shown in FIG. 7. In the example of FIG. 7 the collision energy increases during each cycle at a first substantially linear rate and then at a second substantially linear rate. However, it is contemplated that the collision energy may vary, increase or decrease in other manners. In any given cycle, the manner in which the collision energy is varied may be synchronised with the manner in which the mass to charge ratio transmission is varied.

In the various embodiments described herein, a multidimensional peak detection algorithm may be employed, such as those that have been developed for processing of multi-MS data (e.g. Apex). These may involve pre-processing the data using filters that have been matched to theoretically or experimentally determined peak shapes in mass to charge ratio, elution time or retention time from a sample separation device and the dimension of separation of the mass separator or filter. Alternatively, probabilistic peak detection algorithms may be employed. Separate peak lists may be compiled for low and high energy data. Peak properties may include, but are not limited to, measured mass to charge ratio, measured elution time or retention time from a sample separation device, measured mass separator or filter time, response (i.e. integrated signal), properties describing peak width/shape in any or all of the analytical dimensions.

Detected high energy species may be associated with each other and/or with low energy species based on some or all of the above properties. For example peaks arising from the same precursor are expected to have the same elution time or retention time and/or the same elution time from the mass separator or filter 4 and/or the same peak shape properties. Associations between peaks may be based on the calculated probability that the peaks arise from the same precursor or, more simply, on properties that lie within calculated limits of each other. The probabilities and/or limits may depend on the measured response and the expected statistical behavior of the instrumentation.

Alternatively, the data may be interpreted in a targeted manner. As an example, in a screening or quantitative experiment several fragment ions and a precursor ion may be required to confirm the identity of a particular compound. As well as the targeted mass to charge ratio values, partial information may be provided including elution time or retention time limits. Data processing may include extracting a 1D or 2D dataset corresponding to each targeted mass to charge ratio value in the low and high energy data (where the dimensions may be mass separator or filter (e.g. quadrupole) position and optionally retention time) and deriving and thresholding on correlations or probabilities to establish that the ions originate from the same precursor.

In a mixed mode of data analysis, low energy data may be processed to determine species of interest, and then high energy data may be processed in a targeted manner to find fragments for these species of interest.

In order to prepare the instrument, a calibration procedure may be employed consisting of running a mixture of standards, processing the data using peak detection algorithms (e.g., as described above), matching the detected peaks to theoretically expected peaks, and constructing a mapping or calibration relationship (e.g., in software) between the known mass to charge ratio values and the measured mass separator or filter time, and then recording or storing this mapping or calibration relationship. Multiple calibrations may be created corresponding to different modes of operation of the mass separator or filter, including different scan speeds, resolutions, profile shapes etc.

Alternatively the calibration may be created using a low energy acquisition of any suitable mixture, using the downstream mass analyser to provide reference mass to charge ratio values. In this case, the quality of the mass separator or filter calibration is limited by the quality of the calibration of the downstream mass analyser. This alternative calibration procedure may be regarded as producing a mapping between the mass to charge ratio scale of the mass separator or filter 4 and that of the downstream mass analyser 8 which would remain valid even if the mass analyser was recalibrated.

In experiments in which low energy data is acquired using a particular set of mass separator or filter settings, this low energy data may be used to create a calibration corresponding to these settings. This calibration may be used to calibrate other data acquired on the same instrument using the same settings (for example, high energy data in the same experiment).

A sufficiently fast ion mobility separation may be performed inside each mass separator or filter cycle 4. The ion mobility separation may be performed upstream and/or downstream of the fragmentation device 6. The ion mobility separation may be used to add an extra dimension to the analytical space allowing, for example, separation of species overlapping in mass to charge ratios at different charge states. This separation may be preserved in the persisted data, or used to filter the data prior to persisting it, either to retain only selected features, or to reject unwanted features.

As described above, the instrument may operate in both high and low energy collision modes in a single experimental run, thereby detecting both precursor and fragment ions. Where fragmentation is performed after the ion mobility separation, the fragment ions may be associated with their respective precursors based on them having common ion mobility profiles, e.g. having the same or similar intensity profiles as a function of time. This may be done either in a targeted or untargeted way, as described above.

In various embodiments, ion mobility separation is used to separate ions in a dimension that is strongly correlated with mass to charge ratio so as to allow the duty cycle of the mass analyser (e.g., an oa-ToF mass analyser) to be significantly increased for a subset of species over a wide mass to charge ratio range. This is known as a High Duty Cycle (HDC) mode of operation.

Where ion mobility separation takes place after the fragmentation device 6, HDC may be employed to increase the observed signal in high energy data. Alternatively, or in combination with this, HDC may be employed during low energy acquisition. This may allow the proportion of time spent acquiring low energy data to be reduced, allowing an increase in the duty cycle of the high energy part of the experiment.

Where ion mobility separation is not available on an instrument the duty cycle of the mass analyser 8 (e.g., an oa-ToF mass analyser) may still be significantly increased over a narrower mass to charge ratio range. This is known as an Enhanced Duty Cycle (EDC) mode of operation. The mass to charge ratio range enhanced by EDC may be varied during the separation or filter cycle or with retention time or alternatively may stay fixed.

The instrument described herein may also include an attenuation device for attenuating ions. This device may be used in combination with the mass separator or filter to reduce the response of, or eliminate entirely, ions having a particular m/z range. The attenuation device may be located between the mass separator or filter and the mass analyser. Alternatively, the attenuation device may comprise part of the mass analyser, e.g. the pusher region of an oa-ToF mass analyser.

The modes of acquisition described herein may be combined with other acquisition modes. For example 2D-MSMS cycles described above may be interspersed with standard MS cycles and/or MSMS cycles and/or ion mobility enabled experiments. These experiments may be pre-configured, in a data independent mode of operation, or triggered from data already acquired in a data dependent mode of operation. For example, one or more MSMS experiments may be triggered from a 2D-MSMS experiment. In various embodiments, the MSMS experiment may use a higher resolution mode of the mass separator or filter than the other modes in order to achieve increased specificity.

The instrument may be operated in a mode of operation wherein the mass separator or filter cycles overlap each other in time. In other words, the mass separator or filter 4 performs a plurality of ion ejection or transmission scans, wherein the scans overlap. Between the start and end of a first scan, a second scan is begun. The second scan ends after the first scan has ended, although a third scan may have begun between the start and end of the second scan. The third scan ends after the second scan has ended, although a fourth scan may have begun between the start and end of the third scan. Any number of overlapping scans may be performed. This mode enables multiple mass ranges to be simultaneously ejected or transmitted by the mass separator or filter 4 and may therefore increase the duty cycle of the experiment, or may eliminate or reduce effects related to the finite space charge capacity in the mass separator or filter (e.g. an ion trap).

The overlapping mass separator or filter cycles may start and/or end periodically (e.g. equally spaced apart in time) or may be arranged in a pre-determined or pseudorandom sequence. Such pre-determined or pseudorandom sequence may be used to facilitate subsequent de-multiplexing of overlapping product ion spectra from the overlapping scans.

Figure 8:
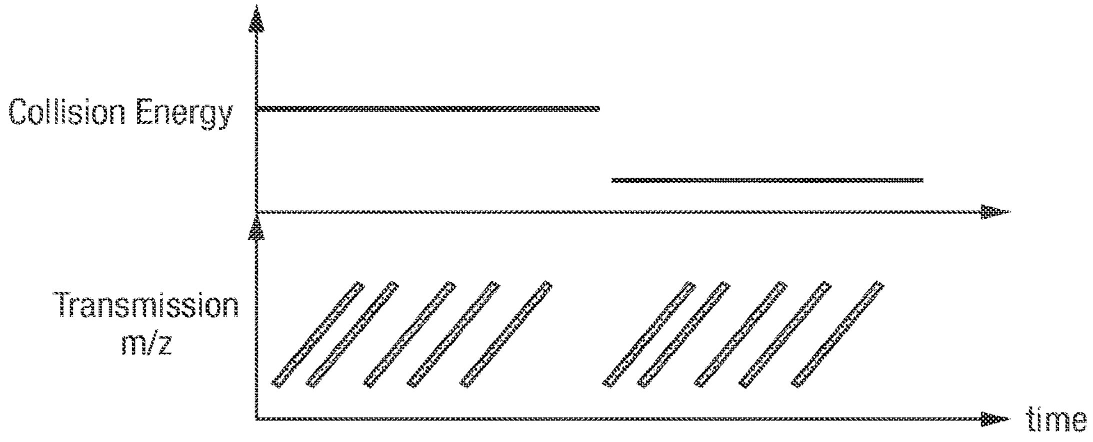
FIG. 8 shows a schematic of an embodiment in which the scans overlap in time.

FIG. 8 shows an example of a mode wherein the instrument is operated with overlapping mass separator or filter cycles. A series of five overlapping mass separator or filter cycles is performed whilst the collision energy is maintained high enough to cause fragmentation in the fragmentation device 6. A subsequent series of five overlapping mass separator or filter cycles is then performed whilst the collision energy is maintained low enough so as to substantially not cause fragmentation in the fragmentation device 6. The number of cycles in each of the two series need not be five, and the different series may comprise different numbers of cycles. Also, the cycles may not overlap as the collision energy transits from high to low collision energy or vice versa.

Although the present invention has been described with reference to preferred embodiments, it will be understood by those skilled in the art that various changes in form and detail may be made without departing from the scope of the invention as set forth in the accompanying claims.

For example, although fragmentation has been descried herein with reference to CID fragmentation and accelerating ions into a fragmentation device at various collision energies, the ions may be fragmented by other means. The ions may be fragmented by exciting ions within the fragmentation device so as to cause them to fragment. For example, an electric field may be varied within the fragmentation device so as to excite the ions into fragmentation. Different levels of excitement may be generated so as to vary the collision energy with which the ions are fragmented.

Fragmentation techniques other than CID are also contemplated for use in the fragmentation device. For example, the precursor ions may be fragmented by ETD, ECD, photo-fragmentation via photons etc.

As an alternative to the fragmentation described herein, the ions may be reacted with reactant ions, electrons, radicals or neutral atoms or molecules so as to produce product ions. For example, rather than alternating the ions between high and low fragmentation modes, the method may repeatedly alternate between high and low reaction modes.

The invention claimed is:

1. A method of mass spectrometry comprising:

separating components of an analyte sample in a sample separation device;

ionising the sample eluting from the sample separation device and supplying the resulting precursor ions to a mass separator or mass filter;

performing a plurality of cycles of operation during a single experimental run, wherein each cycle comprises: mass selectively transmitting precursor ions of a single mass, or range of masses, through or out of the mass separator or mass filter at any given time, wherein the mass separator or mass filter is scanned such that the single mass or range of masses that is capable of being transmitted therefrom is varied with time; wherein in different cycles the mass separator or mass filter is scanned over mass ranges having different start and/or end masses; and mass analysing ions.

2. The method of claim 1, wherein the different cycles have start and/or end masses that vary according to the elution time of the sample separation device.

3. The method of claim 1, wherein the range of masses that the mass separator or mass filter is capable of transmitting at any given time is varied with elution time of the sample separation device.

4. The method of claim 1, wherein the range of masses that the mass separator or mass filter is capable of transmitting at any given time is varied during each of one of more of the cycles.

5. The method of claim 1, wherein the sample separation device is a liquid chromatography device.

6. The method of claim 1, wherein ions transmitted by the mass separator or mass filter in at least some of said cycles are fragmented or reacted, and said mass analysing mass analyses the resulting fragment or product ions.

7. The method of claim 6, wherein the ions are fragmented by electron capture dissociation.

8. The method of claim 6, comprising associating fragment or product ions with their respective precursor ions.

9. The method of claim 1, wherein the mass separator or mass filter is operated such that in each cycle the mass or mass range that is capable of being transmitted therefrom is either continuously scanned or stepped in mass to charge ratio as a function of time.

10. The method of claim 1, wherein the mass filter is a quadrupole mass filter or other multipole mass filter; or wherein the mass separator or mass filter is an ion trap that mass selectively transmits ions of different masses downstream at different times during each cycle.

11. The method of claim 1, comprising separating the precursor ions transmitted by the mass separator or filter according to ion mobility.

12. The method of claim 11, comprising using ion mobility separation to associate ion mobilities with the ions or mass spectra that is detected by the mass analyser.

13. The method of claim 1, comprising using a time of flight mass analyser to perform said mass analysing.

14. A mass spectrometer comprising:

a sample separation device;

an ion source;

a mass separator or mass filter;

a mass analyser; and a controller arranged and adapted to control the spectrometer to:

separate components of an analyte sample in the sample separation device;

ionise the sample eluting from the sample separation device in the ion source and supply the resulting precursor ions to the mass separator or mass filter;

perform a plurality of cycles of operation during a single experimental run, wherein each cycle comprises: mass selectively transmitting precursor ions of a single mass, or range of masses, through or out of the mass separator or mass filter at any given time, wherein the mass separator or mass filter is scanned such that the single mass or range of masses capable of being transmitted therefrom is varied with time; wherein in different cycles the mass separator or mass filter is scanned over mass ranges having different start and/or end masses; and mass analysing ions in the mass analyser.

15. A mass spectrometer comprising:

a sample separation device;

an ion source;

a mass separator or mass filter;

a mass analyser; and a controller arranged and adapted to control the spectrometer to perform a plurality of cycles of operation during a single experimental run, wherein each cycle comprises: mass selectively transmitting precursor ions of a single mass, or range of masses, through or out of the mass separator or mass filter at any given time, wherein the mass separator or mass filter is operated such that the single mass or range of masses capable of being transmitted therefrom is varied with time; and to vary the operation of the mass spectrometer as a function of elution time from the sample separation device; and mass analysing ions in the mass analyser.

* * * * *